US012752189B2

(12) United States Patent
Jiang

(10) Patent No.: US 12,752,189 B2
(45) Date of Patent: Oct. 6, 2026

(54) METHOD FOR CONTROLLING VIRTUAL OBJECT TO RELEASE SKILLS, TERMINAL, MEDIUM, AND PROGRAM PRODUCT

(71) Applicant: TENCENT TECHNOLOGY (SHENZHEN) COMPANY LIMITED, Shenzhen (CN)

(72) Inventor: Shuai Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 578 days.

(21) Appl. No.: 18/349,772

(22) Filed: Jul. 10, 2023

(65) Prior Publication Data

US 2023/0347246 A1 Nov. 2, 2023

Related U.S. Application Data

(63) Continuation of application No. PCT/CN2022/131255, filed on Nov. 11, 2022.

(30) Foreign Application Priority Data

Jan. 26, 2022 (CN) ......................... 202210095865.5

(51) Int. Cl.
*A63F 13/55* (2014.01)
*A63F 13/422* (2014.01)
(Continued)

(52) U.S. Cl.
CPC ............ *A63F 13/55* (2014.09); *A63F 13/422* (2014.09); *A63F 13/44* (2014.09); *A63F 13/533* (2014.09)

(58) Field of Classification Search
CPC ........ A63F 13/55; A63F 13/422; A63F 13/44; A63F 13/533; A63F 13/426; A63F 13/822; A63F 13/525
See application file for complete search history.

(56) References Cited

U.S. PATENT DOCUMENTS 5,386,568 A * 1/1995 Wold ......................... G06F 8/36 718/100
5,634,095 A * 5/1997 Wang ......................... G06F 8/34 715/776
(Continued)

FOREIGN PATENT DOCUMENTS

CN 110624241 A 12/2019
CN 110955370 A 4/2020
(Continued)

OTHER PUBLICATIONS

English machine translation of the description of CN113908534. Obtained from worldwide.espacenet.com. Accessed Jan. 8, 2026. (Year: 2022).*

(Continued)

*Primary Examiner* — Carl V Larsen
(74) *Attorney, Agent, or Firm* — Anova Law Group, PLLC

(57) ABSTRACT

Embodiments of this application disclose a method for controlling a virtual object to release skills in computer games. The method includes displaying a first virtual object and a skill release control, the skill release control being configured to trigger the first virtual object to release a virtual skill; receiving a skill linking operation on n target skill release controls, n being an integer greater than or equal to 2; and controlling the first virtual object to release target virtual skills corresponding to the n target skill release controls in response to a completion of the skill linking operation.

20 Claims, 14 Drawing Sheets

(51) Int. Cl.
*A63F 13/44* (2014.01)
*A63F 13/533* (2014.01)

(56) References Cited

U.S. PATENT DOCUMENTS

| | | | | |
|---|---|---|---|---|
| 6,368,210 | B1 * | 4/2002 | Toyohara | A63F 13/577 463/43 |
| 2013/0260899 | A1 * | 10/2013 | Nemoto | A63F 13/822 463/42 |
| 2015/0238861 | A1 * | 8/2015 | Inamori | A63F 13/5375 463/31 |
| 2016/0271496 | A1 | 9/2016 | Behmaram-Mosavat et al. | |
| 2018/0311582 | A1 * | 11/2018 | Gerhard | A63F 13/426 |
| 2019/0012061 | A1 * | 1/2019 | Hiranuma | G06F 3/0488 |
| 2021/0268383 | A1 | 9/2021 | Uehara et al. | |
| 2022/0032191 | A1 * | 2/2022 | Wei | A63F 13/533 |
| 2023/0033874 | A1 | 2/2023 | Wen et al. | |
| 2023/0036265 | A1 * | 2/2023 | Liu | A63F 13/52 |
| 2023/0078592 | A1 | 3/2023 | Pan | |
| 2023/0347246 | A1 | 11/2023 | Jiang | |
| 2024/0082729 | A1 | 3/2024 | Wan et al. | |

FOREIGN PATENT DOCUMENTS

| | | | | |
|---|---|---|---|---|
| CN | 111589142 | A | * | 8/2020 |
| CN | 111672116 | A | | 9/2020 |
| CN | 111760274 | A | * | 10/2020 |
| CN | 111840988 | A | | 10/2020 |
| CN | 112494955 | A | | 3/2021 |
| CN | 112691377 | A | | 4/2021 |
| CN | 112843719 | A | | 5/2021 |
| CN | 112870688 | A | | 6/2021 |
| CN | 112973125 | A | | 6/2021 |
| CN | 113117330 | A | | 7/2021 |
| CN | 113908534 | A | * | 1/2022 |
| CN | 114404978 | A | | 4/2022 |
| JP | 6677788 | B1 | | 4/2020 |
| WO | 2021227870 | A1 | | 11/2021 |

OTHER PUBLICATIONS

English machine translation of the description of CN111760274. Obtained from worldwide.espacenet.com. Accessed Jan. 8, 2026. (Year: 2020).*

Kyatric. How to Code HUD Cooldown Bars. Code.tutsplus.com. May 16, 2014. Online. Accessed via the Internet. Accessed Jan. 8, 2026. <URL: https://code.tutsplus.com/how-to-code-hud-cooldown-bars--cms-20983t> (Year: 2014).*

The Japan Patent Office (JPO) Notice of Reasons for Refusal for Application No. 2024-532951 Apr. 15, 2025 8 Pages (including translation).

China National Intellectual Property Administration (CNIPA) Office Action 1 for Application No. 202210095865.5, Mar. 21, 2025 11 Pages (including translation).

The World Intellectual Property Organization (WIPO) International Search Report for PCT/CN2022/131255 Dec. 2, 2022 5 Pages (including translation).

* cited by examiner

METHOD FOR CONTROLLING VIRTUAL OBJECT TO RELEASE SKILLS, TERMINAL, MEDIUM, AND PROGRAM PRODUCT

RELATED APPLICATIONS

This application is a continuation of PCT Application No. PCT/CN/131255, filed on Nov. 11, 2022, which in turn claims priority to Chinese Patent Application No. 2022100958655, entitled "METHOD FOR CONTROLLING VIRTUAL OBJECT TO RELEASE SKILLS, TERMINAL, MEDIUM, AND PROGRAM PRODUCT" and filed with the China National Intellectual Property Administration on Jan. 26, 2022. The two applications are both incorporated herein by reference in their entirety.

FIELD OF THE TECHNOLOGY

This application relates to the field of human-computer interaction technologies, and specifically, to virtual object control technology.

BACKGROUND OF THE DISCLOSURE

In application programs based on a two-dimension or three-dimension virtual environment, such as a multiplayer online battle arena (MOBA) game, players may control virtual objects in a virtual scene to release skills to other virtual objects, virtual buildings, and the like, to compete and achieve certain victory objectives.

In related technologies, virtual objects usually have a plurality of virtual skills, and each virtual skill corresponds to an independent skill release control. In a case of receiving an operation triggered based on a certain skill release control, the virtual object may be controlled to release the virtual skill corresponding to the skill release control according to a skill release direction or a skill release range indicated by the operation.

However, a plurality of virtual skills possessed by the same virtual object may be correlated, and the players usually need to control the virtual object to consecutively release a plurality of virtual skills, i.e., releasing combo. However, to consecutively release a plurality of virtual skills based on the skill release operation in related technologies is cumbersome in operation, requires the players to have a high level of operation and reaction speed, and is difficult to perform.

SUMMARY

An embodiment of this application provides a method for controlling a virtual object to release skills, a terminal, a medium, and a program product, which can simplify an operation process performed by users controlling the virtual object to consecutively release a plurality of virtual skills, and reduce the operation difficulty in controlling the virtual object to consecutively release a plurality of virtual skills. The technical solutions are as follows:

One aspect of this application provides a method for controlling a virtual object to release skills, which is performed by a terminal. The method includes displaying a first virtual object and a skill release control, the skill release control being configured to trigger the first virtual object to release a virtual skill; receiving a skill linking operation on n target skill release controls, n being an integer greater than or equal to 2; and controlling the first virtual object to release target virtual skills corresponding to the n target skill release controls in response to an end of the skill linking operation.

Another aspect of this application provides a terminal, including a processor and a memory; and the memory stores at least one instruction, at least one program, and a code set or an instruction set, and the at least one instruction, the at least one program, and the code set or the instruction set is loaded and executed by the processor to implement the method for controlling the virtual object to release skills in the foregoing embodiments.

In another aspect, an embodiment of this application provides a non-transitory computer-readable storage medium. The computer-readable storage medium stores at least one computer program, and the computer program is loaded and executed by a processor to implement the method for controlling the virtual object to release the skills in the foregoing embodiments.

In embodiments of this application, after receiving the skill linking operation acting on the n target skill release controls, the first virtual object is controlled to automatically release the target virtual skills respectively corresponding to the n target skill release controls, so that users may trigger a plurality of virtual skills by one operation. Compared with the way of triggering the release of a plurality of skills by repeatedly operating the skill release controls in related technologies, the user operation is simplified, and the difficulty in consecutively releasing the virtual skills is reduced.

DESCRIPTION OF EMBODIMENTS

Figure 1:
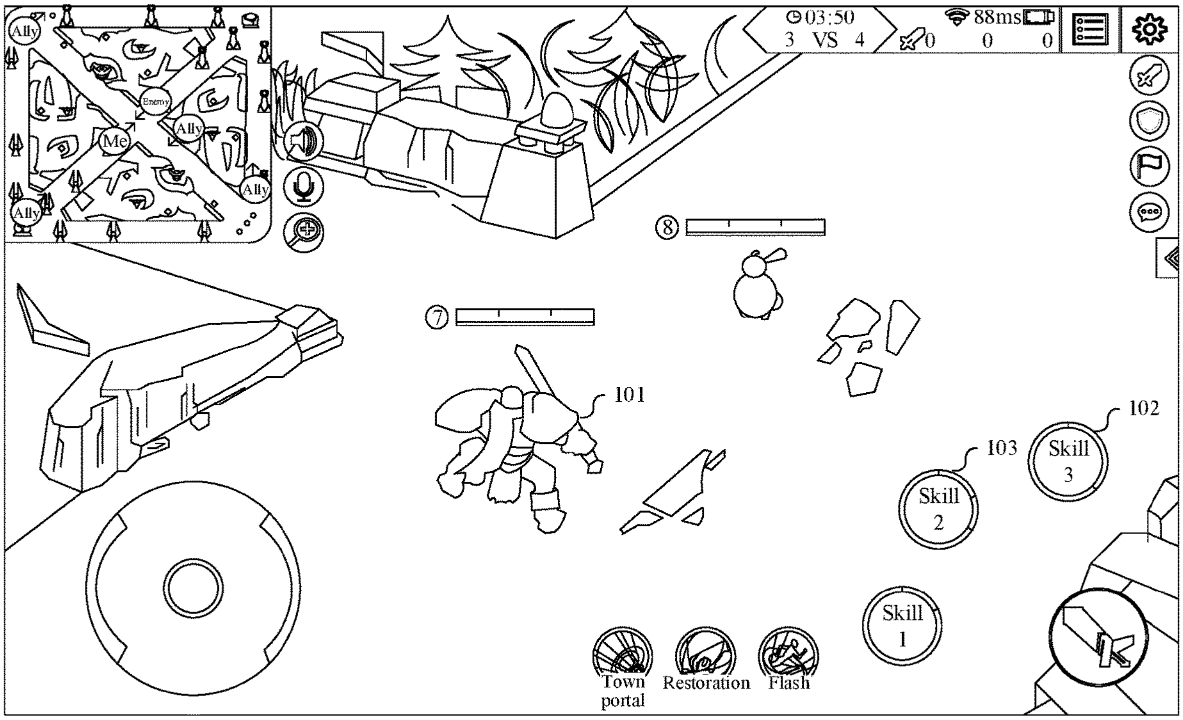
FIG. 1 is a schematic diagram of a virtual environment interface according to an embodiment of this application.

To make objectives, technical solutions, and advantages of this application clearer, implementations of this application are further described in detail below with reference to the accompanying drawings.

"A plurality of" mentioned in the specification means two or more. "And/or" describes an association relationship for describing associated objects, and represents that three relationships may exist. For example, A and/or B may represent the following three cases: only A exists, both A and B exist, and only B exists. The character "/" in this specification generally indicates an "or" relationship between the associated objects.

First, terms involved in some embodiments of this application are introduced.

Virtual world: the virtual world is displayed (provided) during the running of an application program on a terminal. The virtual world may be a simulation world for the real world, a semi-simulation and semi-fiction virtual world, or a purely fictional virtual world. The virtual world may be any of a two-dimension virtual world, a 2.5-dimension virtual world, and a three-dimension virtual world. In some embodiments, the virtual world is also configured to support a virtual battle between at least two virtual objects, and the virtual world has virtual resources that may be used by at least two virtual objects. In some embodiments, the virtual world includes a symmetric left lower corner area and right upper corner area, and the virtual objects belonging two rival camps occupy one of the areas respectively, and take destroying the virtual elements such as target buildings/strongholds/bases/crystal towers deep in the area of the opponent as a victory goal.

Virtual object: the virtual object refers to a movable object in the virtual world. The movable object may be at least one of a virtual figure, a virtual animal, a cartoon figure, and the like. In some embodiments, in a case that the virtual world is a three-dimension virtual world, the virtual object may be a three-dimension model, and each virtual object respectively has own shape and size in the three-dimension virtual world, and occupies a part of space in the three-dimension virtual world. In some embodiments, the virtual object is a three-dimension character constructed based on a three-dimension human skeleton technology. The virtual object presents different appearances by wearing different skins. In some implementations, the virtual object may also be implemented by a 2.5-dimension or 2-dimension model, which is not limited in some embodiments of this application.

Multiplayer online battle arena (MOBA) game: the MOBA game is a game where different virtual objects belonging to at least two rival camps in the virtual world respectively take up a map area, and take a certain victory condition as a goal to compete. The victory condition includes, but is not limited to at least one of the following: taking up a stronghold or destroying an enemy camp stronghold, defeating the virtual object of the enemy camp, ensuring the survival in a specific scene and time, striving for a certain resource, and achieving higher score than the enemy within a specific time. The tactical competition may be carried out with a round as a unit, and each round of tactical competition may have the same map, or different maps. Each camp includes one or more virtual objects, such as, one, two, three, or five, and the like.

User interface (UI) control: the UI control refers to any control or element that can be seen on a user interface of the application program, such as a picture, an input box, a text box, a button, a tag, and the like, and some UI controls may respond to the operation of the user.

In related technologies, virtual objects usually have a plurality of virtual skills, and each virtual skill corresponds to an independent skill release control. In a case of receiving an operation triggered based on a certain skill release control, the terminal may control the virtual object to release the virtual skill corresponding to the skill release control according to a skill release direction or a skill release range indicated by the operation. However, a plurality of virtual skills possessed by the same virtual object may be correlated, the players usually need to control the virtual object to consecutively release a plurality of virtual skills, i.e., releasing combo. For example, the first skill may enable the attacked virtual object to carry a special mark, and a second skill may enable the virtual object carrying the special mark to suffer higher damage than other virtual objects. Therefore, the virtual object may be controlled to release the first skill first and then release the second skill. As shown in FIG. 1, the player needs to first trigger a skill release control 102 corresponding to a skill 3, and controls a first virtual object 101 to release the skill 3, and after the skill 3 is completely released, the player can re-trigger the skill release control 103 corresponding to a skill 2, and controls the first virtual object to release the skill 2. Thus, can be seen that controlling the virtual object to consecutively release a plurality of virtual skills based on the skill release operation in related technologies is complicated in operation; and moreover, after the attacked virtual object is attacked, the player controlling the virtual object may control the virtual object to move and hide. Then, the player releasing the attack skill is required to have a high level of operation and reaction speed to release the effective attack skill again for the virtual object. In a case that an interval between the release of the two skills is relatively long, the skill effect may be weakened. Thus, the operation difficulty in controlling the virtual object to consecutively release a plurality of virtual skills is high.

To solve the foregoing technical problems, this application provides a method for controlling a virtual object to release skills. The method is performed independently by a terminal equipped and run with an application program supporting a virtual environment, or performed collaboratively by the terminal and a background server corresponding to the application program. After receiving the skill linking operation, the terminal automatically controls the first virtual object to consecutively release the target virtual skills respectively corresponding to n target skill release controls based on n (n is an integer greater than or equal to 2) target skill release controls indicated by the skill linking operation, and a skill release order, so that the user may trigger a plurality of virtual skills by one operation, and compared with relevant technologies, the user operation can be simplified, and the difficulty in controlling the virtual object to consecutively release a plurality of virtual skills is reduced.

Figure 2:
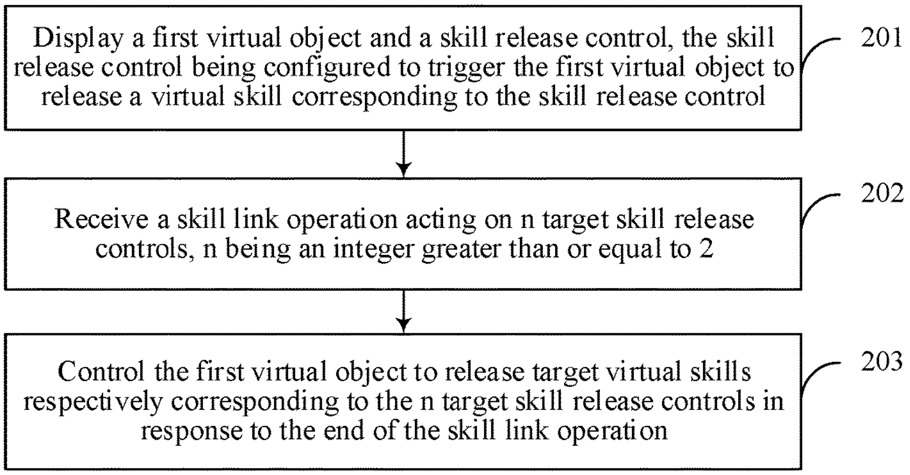
FIG. 2 is a flowchart of a method for controlling a virtual object to release skills according to an embodiment of this application.

Referring to FIG. 2, a flowchart of a method for controlling a virtual object to release skills provided by an embodiment of this application is shown. This embodiment uses the method performed by a terminal supporting the display of a virtual environment as an example. The method includes the following steps:

Step 201: Display a first virtual object and a skill release control, the skill release control being configured to trigger the first virtual object to release a virtual skill corresponding to the skill release control.

In one embodiment, the terminal displays a virtual environment interface, including a virtual environment picture, and a control layer located above the virtual environment picture. The first virtual object is displayed in the virtual environment picture. The first virtual object is the virtual object controlled by the terminal in some embodiments of this application; and a UI control of the control layer includes a skill release control, and the skill release control is configured to trigger the first virtual object to release the virtual skill corresponding to the skill release control. In addition, the virtual environment picture also includes other virtual objects, and virtual elements in a field of view such as buildings, plants, props, and the like. The UI control also includes different functional controls such as an ordinary attack control, a map display control, an information bar, and the like.

For example, the virtual environment may be a virtual world with any boundary shape, and the first virtual object may be located in a visible range of the virtual environment interface. In some embodiments, the first virtual object is located at a visual center of the virtual environment picture, that is, located at the center of the virtual environment picture when a third-person viewing angle is adopted to observe the virtual world.

A viewing angle refers to an observation angle observing in the virtual world from the first-person viewing angle or a third-person viewing angle of the virtual object. In some embodiments, in the embodiment of this application, the viewing angle is an angle for observing the virtual object in the virtual world by a camera model. In some embodiments, the camera model automatically follows the virtual object in the virtual world, that is, in a case that the position of the virtual object in the virtual world is changed, the position of the camera model in the virtual world is also changed with the virtual object, and the camera model is always located within a preset distance range of the virtual object in the virtual world. In some embodiments, in the automatic following process, the relative position of the camera model and the virtual object is not changed. The embodiment of this application takes the third-person viewing angle as an example for description, and In some embodiments the camera model is located behind the virtual object (such as a head and a shoulder of a virtual figure).

Step 202: Receive a skill linking operation acting on n target skill release controls, n being an integer greater than or equal to 2.

In one embodiment, the first virtual object has at least two different virtual skills, and each virtual skill correspondingly has the skill release control. In a case of receiving an operation on a target skill release control, the terminal controls the first virtual object to release the target virtual skill corresponding to the target skill release control, that is, the player may independently trigger one of the skill release controls, so that the terminal controls the first virtual object to release a corresponding virtual skill.

However, it is usually necessary to control the virtual object to consecutively release a plurality of virtual skills to the same target in a battle process. For example, the first virtual object cannot completely defeat an enemy virtual object with one virtual skill, so the first virtual object needs to use two virtual skills; or, there is an association between a plurality of virtual skills of the first virtual object (for example, the skill 2 can perform special marking on the enemy virtual object, and the skill 3 has a higher damage value on the virtual object with the special mark than other virtual objects). In the above case, the player often needs to control the first virtual object to release at least two virtual skills.

In a case of receiving the skill linking operation, the terminal controls the first virtual object to release n target virtual skills indicated by the skill linking operation, so that the player may enable the terminal to control the first virtual object to consecutively release a plurality of target virtual skills by using the skill linking operation.

In some embodiments, the skill linking operation on the target skill release control is triggered by a touch screen of the terminal, or triggered by a key set on the terminal, or triggered based on a voice instruction, or triggered by a joystick connected with the terminal, which is not limited in some embodiments of this application.

It is worth mentioning that the terminal determines the skill release control receiving the skill linking operation as the target skill release control, and the skill linking operation is not an operation for n specific skill release controls.

Step 203: Control the first virtual object to release target virtual skills respectively corresponding to the n target skill release controls in response to the end of the skill linking operation.

The skill linking operation acting on the n target skill release controls is a complete and consecutive user operation. In a case that the skill linking operation is not ended, for the target skill release control that is already affected by the skill linking operation, the terminal may not control the first virtual object to release the corresponding target virtual skill. In a case of detecting the end of the skill linking operation, the terminal determines that the n target skill release controls are triggered, and controls the first virtual object to release the target virtual skills respectively corresponding to the n target skill release controls.

In some embodiments, the skill linking operation also indicates a release order of the target virtual skills, and the terminal controls the first virtual object to successively release the target virtual skills based on the skill release order; or, after the skill linking operation is ended, the terminal automatically determines the skill release order according to information of each target virtual skill such as a skill release condition, a skill release effect, and the like, and controls the first virtual object to release the target virtual skills according to the skill release order, so that the effect of the first virtual object for releasing the skill is best (for example, the resulting damage value is maximal). The player only needs to select the to-be-released skill without considering the skill release order, so that the operation difficulty is low.

For example, in a case of detecting the skill linking operation, the terminal acquires the skill release order indicated by the skill linking operation, and determines the skill release order as target virtual skill a-target virtual skill b-target virtual skill c. In a case of determining the end of the skill linking operation, the terminal first controls the first virtual object to release the target virtual skill a; in a case that the target virtual skill a is released completely, the terminal automatically controls the first virtual object to continue to release the target virtual skill b; and in a case that the target virtual skill b is released completely, the terminal automatically controls the first virtual object to release the target virtual skill c. It is thus clear that by adopting the method provided by some embodiments of this application, the three trigger operations of the user may be integrated into one, so that the user operation is simplified, the operation duration can be shortened, and a plurality of skills can be released without interval; and moreover, the skill linking operation may also indicate the skill release order, so that the user may accurately control the order of the target virtual skills released by the first virtual object by one operation, thereby improving the consecutive release efficiency and accuracy of a plurality of skills, and further simplifying the operation process.

In conclusion, in some embodiments of this application, after receiving the skill linking operation acting on the n target skill release controls, the first virtual object is controlled to automatically release the target virtual skills respectively corresponding to the n target skill release controls, so that the user may trigger a plurality of virtual skills by one operation. Compared with the way of triggering the release of a plurality of skills by repeatedly operating the skill release control for multiple times in related technologies, the user operation is simplified, and the difficulty in consecutively releasing the virtual skills is reduced.

Figure 3:
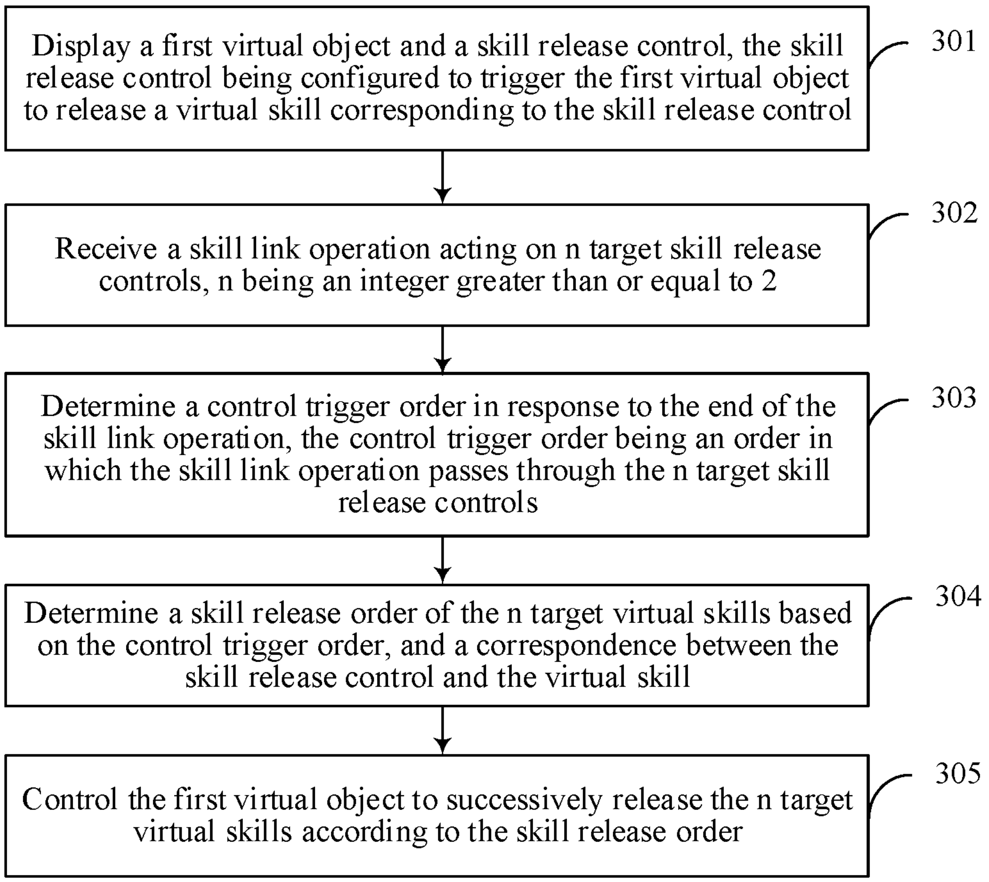
FIG. 3 is a flowchart of a method for controlling a virtual object to release skills according to another embodiment of this application.

In addition to control the first virtual object to release the target virtual skills according to the skill release order, the terminal also needs to determine a release target, and control the first virtual object to successively release n target virtual skills to the release target. Referring to FIG. 3, a flowchart of a method for controlling a virtual object to release skills according to another embodiment of this application is shown. This embodiment uses the method performed by a terminal supporting the display of a virtual environment as an example. The method includes the following steps:

Step 301: Display a first virtual object and a skill release control, the skill release control being configured to trigger the first virtual object to release a virtual skill corresponding to the skill release control.

Step 302: Receive a skill linking operation acting on n target skill release controls, n being an integer greater than or equal to 2.

Specific implementations of steps 301 to 302 are the same as those of steps 201 to 202 described above, and are not described in detail herein again.

Step 303: Determine a control trigger order in response to the end of the skill linking operation, the control trigger order being an order in which the skill linking operation passes through n target skill release controls.

In one embodiment, the terminal determines the skill release order based on a link order of the skill linking operation for the target skill release controls. The user may enable the skill linking operation to successively pass through each target skill release control according to a skill release policy, so that the order in which the first virtual object releases the target virtual skills is controllable.

In some embodiments, the terminal determines the control trigger order based on a touch order of the skill linking operation on the target skill release controls on the touch screen, or, the terminal determines the control trigger order based on a movement trajectory of the joystick in a gamepad.

Figure 4:
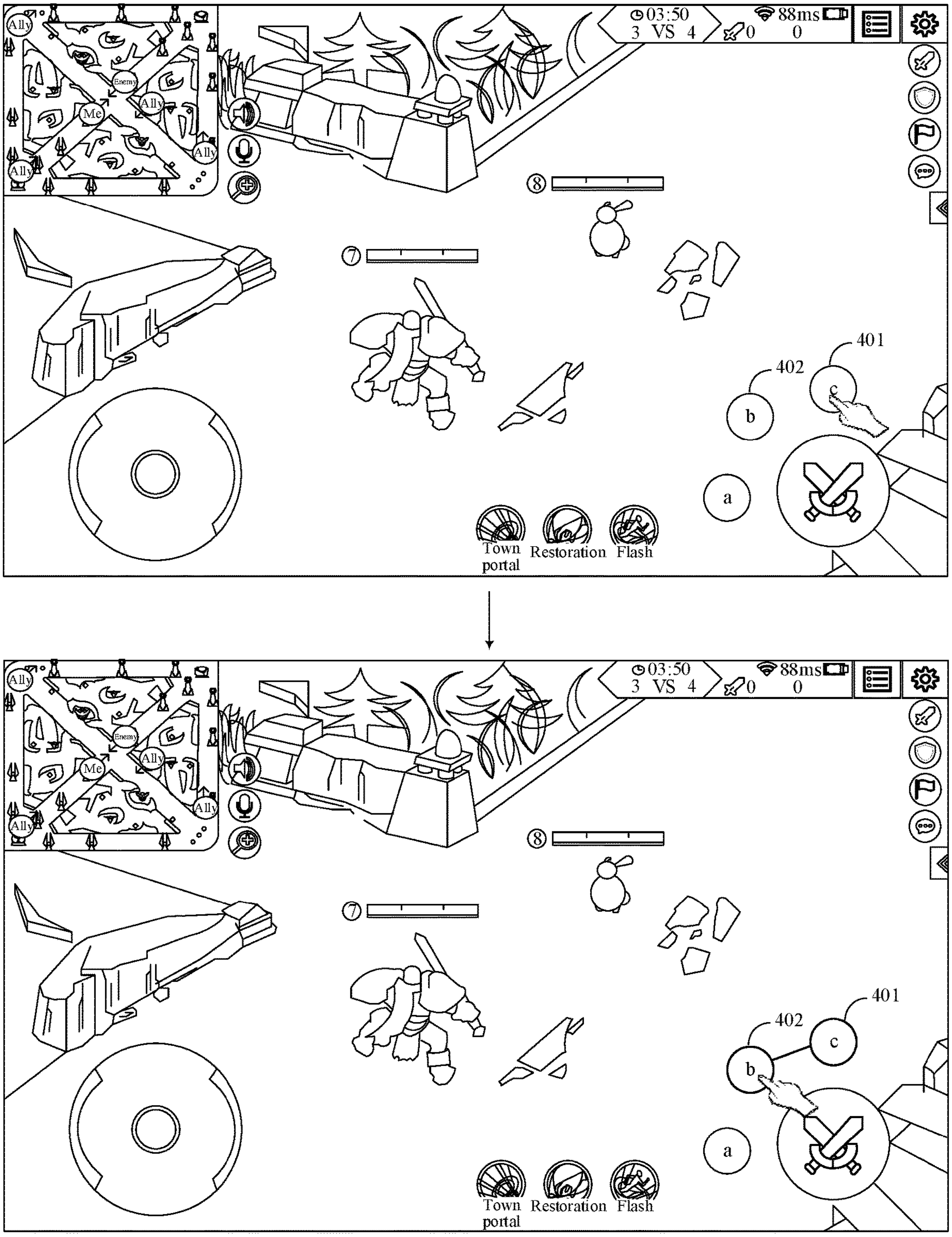
FIG. 4 is a schematic diagram of a skill linking operation according to an embodiment of this application.

For example, as shown in FIG. 4, the skill linking operation is implemented by a slide operation acting on the target skill control. The terminal receives the slide operation from a target skill release control 401 to a target skill release control 402, and determines the control trigger order as the target skill release control 401-the target skill release control 402.

Step 304: Determine the skill release order of the n target virtual skills based on the control trigger order, and a correspondence between the skill release control and the virtual skill.

There is a one-to-one correspondence between the skill release control and the virtual skill, and the terminal determines the skill release order based on the correspondence between the skill release control and the virtual skill, and the control trigger order. For example, for the example in step 303, the target skill release control 401 corresponds to the target virtual skill c, and the target skill release control 402 corresponds to the target virtual skill b, so that the skill release order is the target virtual skill c-the target virtual skill b.

Step 305: Control the first virtual object to successively release the n target virtual skills according to the skill release order.

The implementation of step 305 may refer to step 203, which is not described again in this embodiment.

In some embodiments of this application, the terminal determines the skill release order based on the order in which the skill linking operation triggers the target skill release controls, so that the user may voluntarily select the skill release order based on the skill release policy, thereby improving the flexibility in releasing the plurality of skills.

Figure 5:
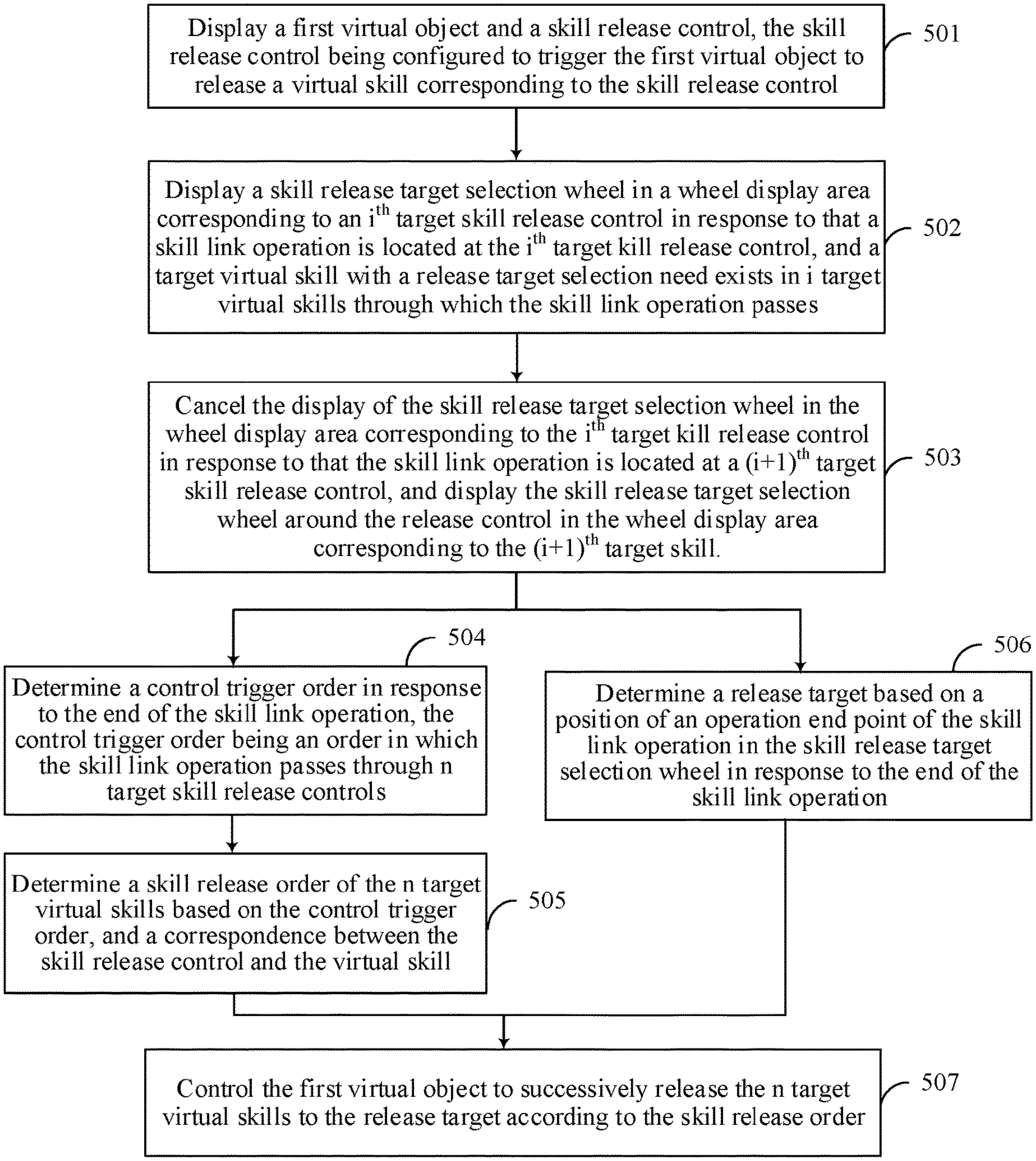
FIG. 5 is a flowchart of a method for controlling a virtual object to release skills according to another embodiment of this application.

According to the foregoing embodiments, on the basis of controlling the first virtual object to release the target virtual skills according to the control trigger order, the terminal also needs to determine the release target, and controls the first virtual object to successively release the target virtual skills to the release target. Referring to FIG. 5, a flowchart of a method for controlling a virtual object to release skills according to another embodiment of this application is shown. This embodiment uses the method performed by a terminal supporting the display of a virtual environment as an example. The method includes the following steps:

Step 501: Display a first virtual object and a skill release control, the skill release control being configured to trigger the first virtual object to release a virtual skill corresponding to the skill release control.

An implementation of step 501 may refer to step 201, which is not described again in this embodiment.

Step 502: Display a skill release target selection wheel in a wheel display area corresponding to an $i^{th}$ target skill release control in response to that the skill linking operation is located at the $i^{th}$ target skill release control, and a target virtual skill with a release target selection need exists in the i target virtual skills through which the skill linking operation passes.

The release target includes at least one of a release area, a release direction, or a release object. In the virtual skills possessed by the virtual object, there are usually the virtual skills needing to set the release target such as the release area, the release direction, the release object, or the like. The release target is selected by triggering the release target selection wheel in the wheel display area corresponding to the target skill release control, and the wheel display area corresponding to the target skill release control may be displayed around the target skill release control. In a case that a single target skill release control is triggered, and the target virtual skill corresponding to the target skill release control needs to set the release target, the terminal displays the release target selection wheel around the target skill release control. For the skill linking operation acting on a plurality of target skill release controls, since the trigger release of the plurality of target virtual skills needs to be completed by one operation, in a case of displaying the wheel around the target skill release control corresponding to the target virtual skill with the release target selection need, on one hand, in a case that other virtual skill controls need to be triggered after the target skill release control is triggered, the trigger operation may cause the change of the release target in a process of moving from the wheel to the next skill release control. On the other hand, in a case that there are a plurality of target virtual skills with the release target selection need, the user needs to repeatedly select the release target for multiple times, so that the operation process is complicated, the operation difficulty is high, and the touch by mistake or interruption of operation may be caused.

In one embodiment, the terminal displays the release target selection wheel only at the last target skill release control triggered at present. That is, in a case that the skill linking operation extends from the first target skill release control to the $i^{th}$ target skill release control, and the target virtual skill with the release target selection need exists in the target virtual skills corresponding to the i target skill release controls through which the skill linking operation passes, the terminal displays the skill release target selection wheel around the $i^{th}$ target skill release control. i is a positive integer less than n.

Figure 6:
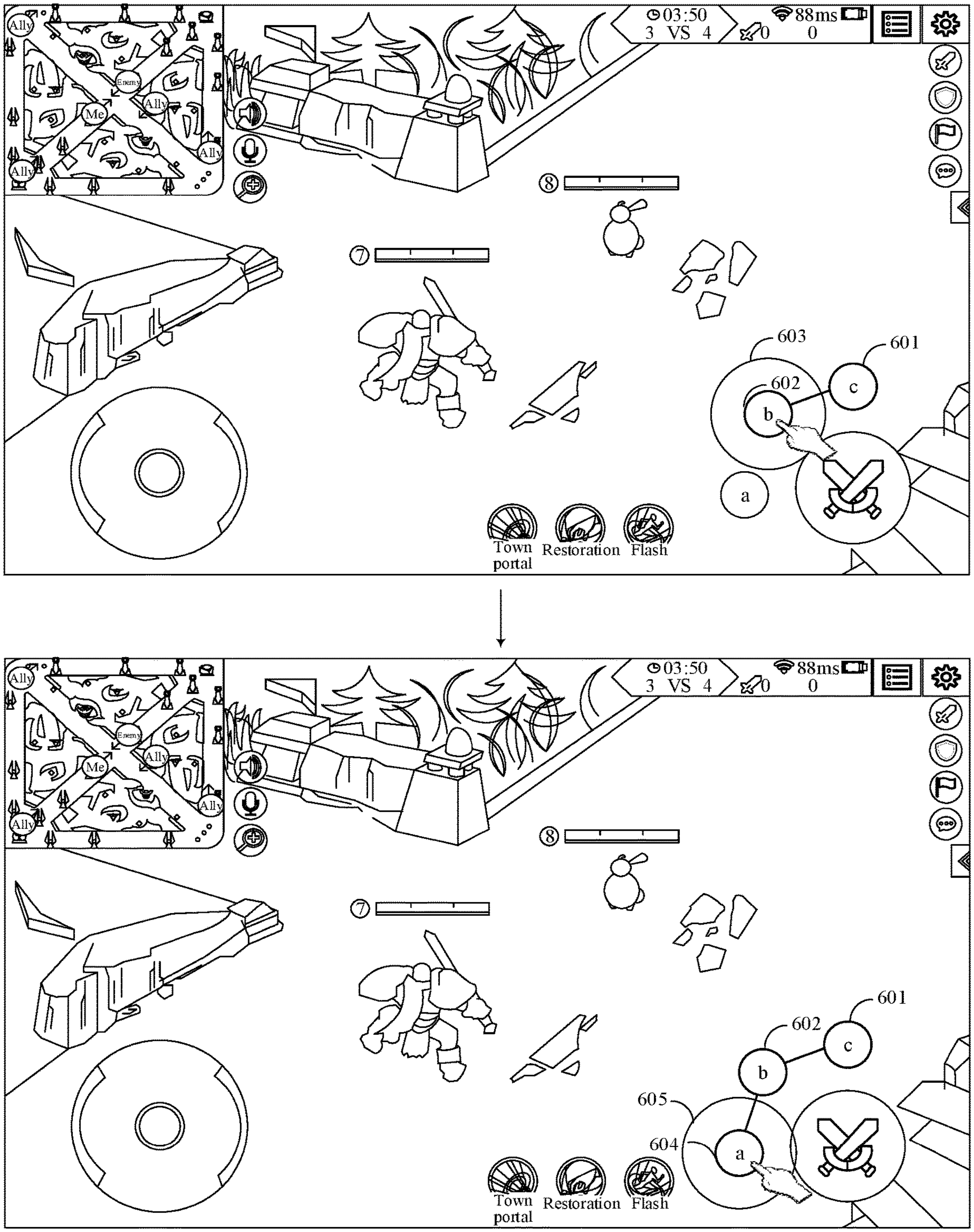
FIG. 6 is a schematic diagram of a skill linking operation according to another embodiment of this application.

For example, as shown in FIG. 6, the skill linking operation successively passes through the target skill release control 601 and the target skill release control 602, the target skill release control 601 is configured to trigger the target virtual skill c, and the target skill release control 602 is configured to trigger the target virtual skill b. In a case that the target virtual skill c or the target virtual skill b has the release target selection need, the terminal displays the release target selection wheel 603 around the target skill release control 602.

Step 503: Cancel the display of the skill release target selection wheel in the wheel display area corresponding to the $i^{th}$ target skill release control, and display the skill release target selection wheel around the release control in the wheel display area corresponding to the $(i+1)^{th}$ target skill in response to that the skill linking operation is located at the $(i+1)^{th}$ target skill release control.

In a case that the skill linking operation extends from the $i^{th}$ target skill release control to the $(i+1)^{th}$ skill release control, the $(i+1)^{th}$ target skill release control is used as the last target skill release control through which the current skill linking operation passes, and the terminal displays the skill release target selection wheel only in the wheel display area (may be around the $(i+1)^{th}$ target skill release control) corresponding to the $(i+1)^{th}$ target skill release control, and cancels the display of the skill release target selection wheel in the wheel display area corresponding to the $i^{th}$ target skill release control.

As shown in FIG. 6, the skill linking operation slides to the target skill release control 604 after passing through the target skill release control 602, and the terminal displays the release target selection wheel 605 around the target skill release control 604.

By adopting a release target selection mechanism provided in some embodiments of this application, the user only needs to control the selection of the release target in the release target selection wheel around the last target skill release control through which the skill linking operation passes before the end of the skill linking operation so as to complete the setting operation on the release target of all target virtual skills with the release target selection need, and it is unnecessary to select the release target in the process of linking the target skill release control and to select the release target for multiple times, so that the release operation of multiple skills is further simplified.

Step 504: Determine the control trigger order in response to the end of the skill linking operation, the control trigger order being an order in which the skill linking operation passes through n target skill release controls.

Step 505: Determine the skill release order of the n target virtual skills based on the control trigger order, and a correspondence between the skill release control and the virtual skill.

Specific implementations of steps 504 to 505 may refer to steps 303 to 304 described above, which are not described in detail herein again.

Step 506: Determine the release target based on a position of an operation end point of the skill linking operation in the skill release target selection wheel in response to the end of the skill linking operation.

In one embodiment, the skill linking operation is a slide operation, and in a case that a slide trajectory of the skill linking operation extends to the skill release target selection wheel and is ended, the terminal determines the release target based on the position of the operation end point (a slide end point) of the skill linking operation, and the position of a center point of the release target selection wheel.

The release target includes at least one of a release area, a release direction, and a release object. Different types of release targets have different determination processes, and step 506 includes the following steps:

Step 506*a*: Determine the release area based on a relative position relationship and a position of the first virtual object in the virtual environment in a case that the release target is the release area, the relative position relationship being determined based on a relative position between the operation end point and the center point of the release target selection wheel.

In a skill release process, in a case that there is the target virtual skill needing to be released in the release area, the terminal maps the center point of the release target selection wheel to the position of the first virtual object in the virtual environment, and maps the operation end point of the skill linking operation to a positioning point of the release area. Therefore, the relative position relationship between the operation end point and the center point of the release target selection wheel is equivalent to the relative position relationship between the positioning point of the release area and the position of the first virtual object, and based on this, the terminal may determine the position of the release area. The release area in the virtual environment is then determined based on parameters such as a preset area of the release area and the like.

Figure 7:
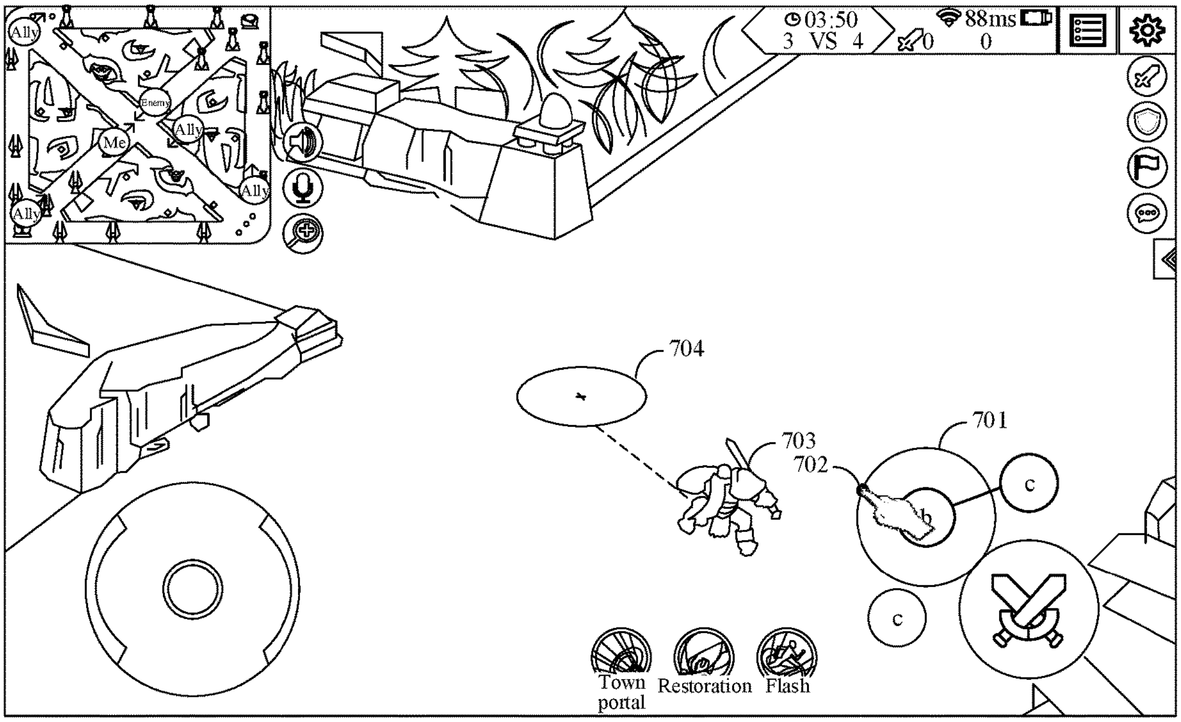
FIG. 7 is a schematic diagram of selecting a release area according to an embodiment of this application.

For example, as shown in FIG. 7, in a case of detecting the skill linking operation, the terminal displays a preview effect of the release target in real time based on the position of an operation point of the skill linking operation. The target virtual skill c with the release area selection need exists at present, so the terminal determines the release area 704 based on the center point of the release target selection wheel 701, the position of the operation end point 702, and the position of the first virtual object 703 in the virtual environment, and displays the release area 704 through the virtual environment interface. In a case that the skill linking operation is ended, and the first virtual object releases the target virtual skill c, the terminal controls the first virtual object to release the target virtual skill c in the release area 704.

Step 506*b*: Determine the release direction based on an azimuth of the operation end point relative to the center point of the release target selection wheel in a case that the release target is the release direction.

In the skill release process, in a case that there is the target virtual skill that needs to be released in the release direction, the terminal maps the center point of the release target selection wheel to the position of the first virtual object in the virtual environment, and maps the direction of the operation end point relative to the center point of the release target selection wheel to the release direction of the target virtual skill.

Figure 8:
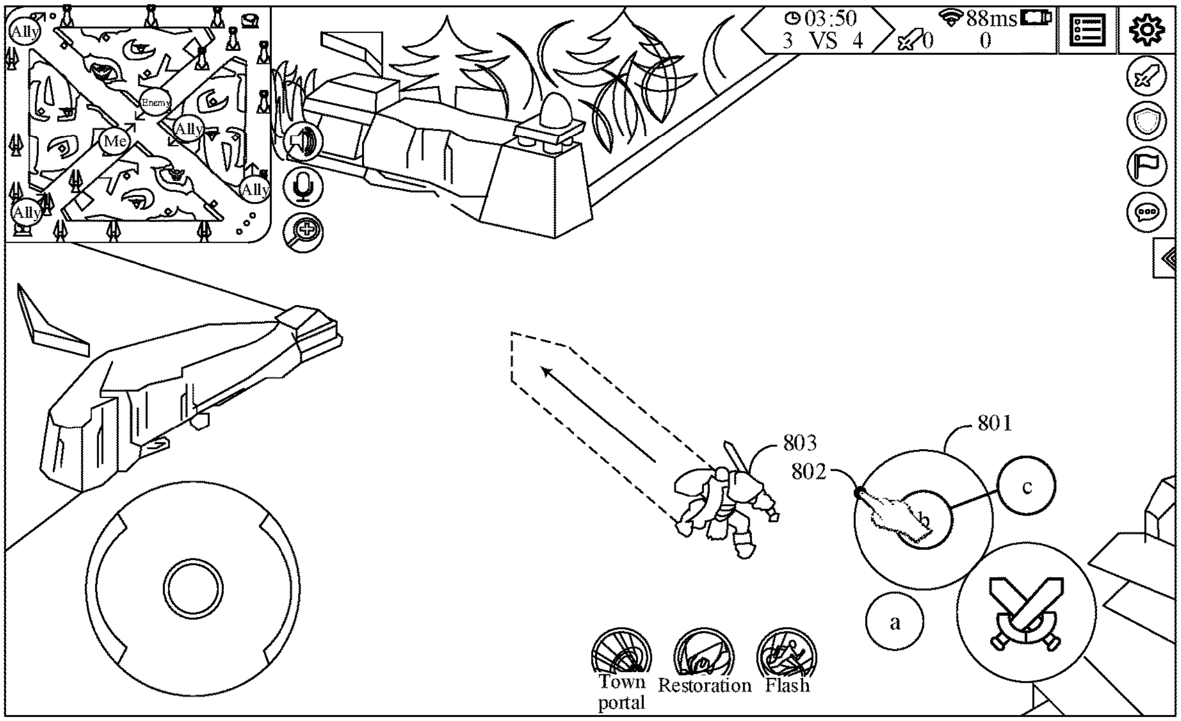
FIG. 8 is a schematic diagram of selecting a release direction according to an embodiment of this application.

For example, as shown in FIG. 8, in a case of detecting the skill linking operation, the terminal displays the preview effect of the release target in real time based on the position of the operation point of the skill linking operation. The target virtual skill b with the release direction selection need exists at present, so the terminal determines the release direction (i.e., the direction indicated by an arrow in the figure) based on the center point of the release target selection wheel 801, the position of the operation end point 802, and the position of the first virtual object 803 in the virtual environment, and displays the indication information (a dotted line in the figure) of the release direction through the virtual environment interface.

Step 506*c*: Determine the release object from the second virtual object based on an azimuth of the operation end point relative to the center point of the release target selection wheel in a case that the release target is the release object.

In the skill release process, in a case that the target virtual skill needing to be released to the release object, the terminal maps the center point of the release target selection wheel to the position of the first virtual object in the virtual environment, and determines the release object from the second virtual object based on the azimuth (including a direction and a position) of the operation end point relative to the center point of the release target selection wheel, so that the first azimuth is consistent with the second azimuth, the first azimuth is the azimuth of the operation end point relative to the center point of the release target selection wheel, and the second azimuth is the azimuth of the release object relative to the first virtual object.

Figure 9:
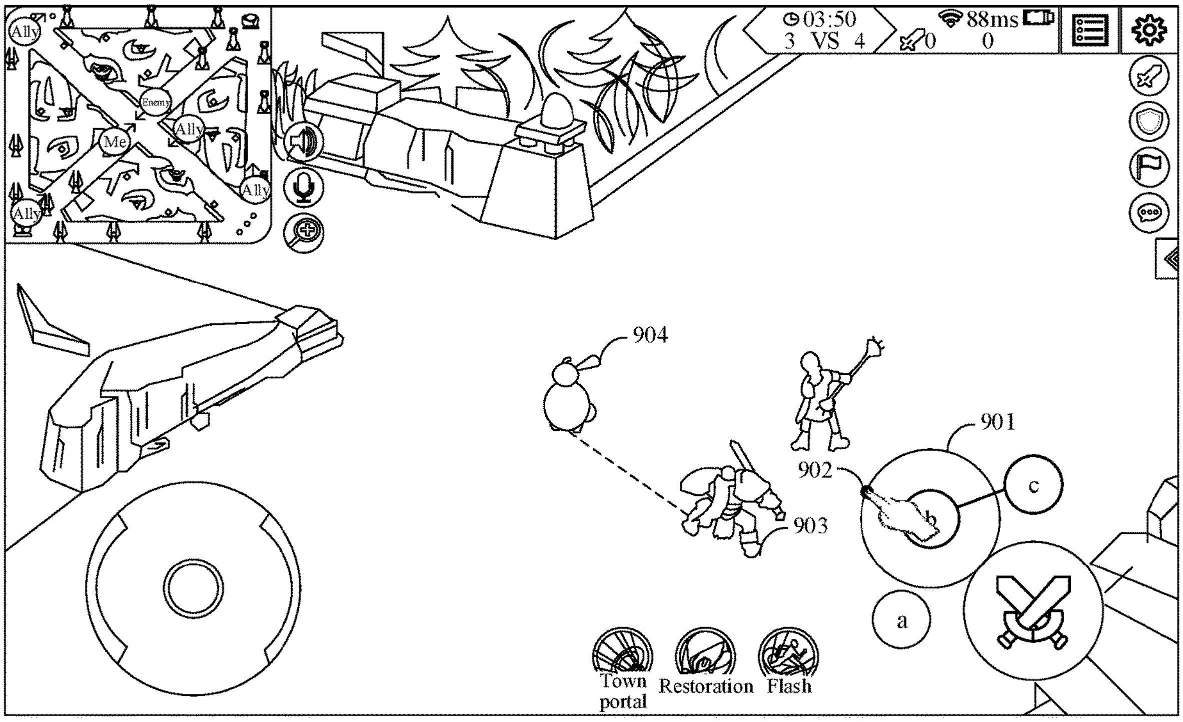
FIG. 9 is a schematic diagram of selecting a release object according to an embodiment of this application.

For example, as shown in FIG. 9, in a case of detecting the skill linking operation, the terminal displays a preview effect of the release target in real time based on the position of the operation point of the skill linking operation. The target virtual skill c with the release object selection need exists at present, so the terminal determines the release object 904 from the existing two second virtual objects based on the center point of the release target selection wheel 901, the position of the operation end point 902, and the position of the first virtual object 903 in the virtual environment, and prompts through a link line between the first virtual object 903 and the release object 904.

Step 507: Control the first virtual object to successively release n target virtual skills to the release target according to the skill release order.

In one embodiment, after determining the release target, the terminal controls the first virtual object to successively release n target virtual skills indicated by the skill linking operation to the release target according to the skill release order. Specifically, for the target virtual skill with the release target selection need, the terminal controls the first virtual object to release to the release object, and for the target virtual skill without the release target selection need, the terminal controls the first virtual object to release according to a corresponding skill release logic.

In some embodiments of this application, in a case that the target virtual skill with the release target selection need exists, the terminal displays the release target selection wheel at the last target skill control through which the skill linking operation passes, the user only needs to control the selection of the release target in the release target selection wheel around the last target skill release control before the end of the skill linking operation, so as to complete the setting operation on the release target of all target virtual skills with the release target selection need, and it is unnecessary to select the release target in the process of linking the target skill release control and to select the release target for multiple times, so that the release operation of multiple skills is further simplified.

Figure 10:
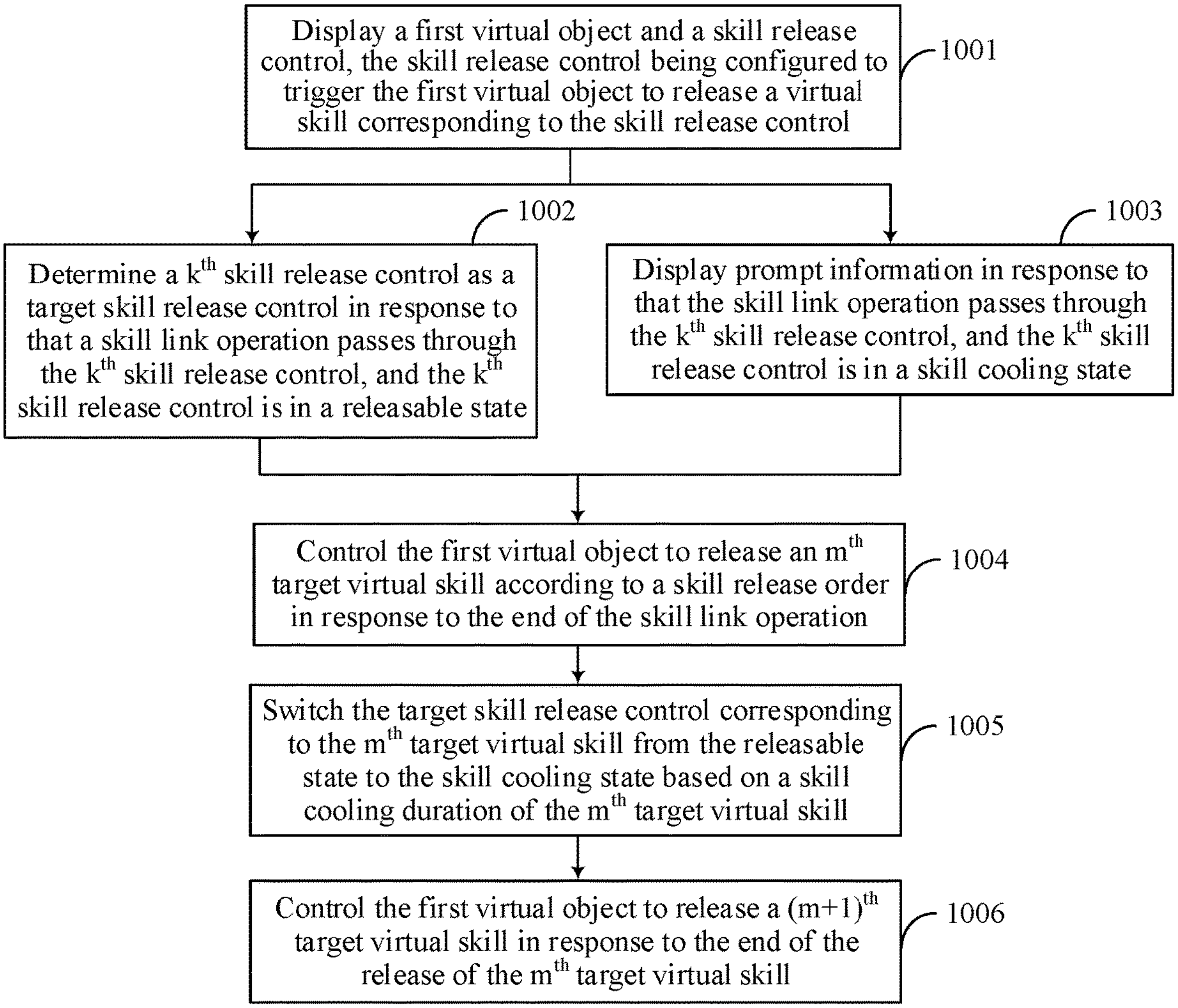
FIG. 10 is a flowchart of a method for controlling a virtual object to release skills according to another embodiment of this application.

In one embodiment, the virtual skill has a skill cooling mechanism. Referring to FIG. 10, a flowchart of a method for controlling a virtual object to release skills according to another embodiment of this application is shown. The embodiment uses the method performed by the terminal supporting the display of a virtual environment as an example. The method includes the following steps.

Step 1001: Display a first virtual object and a skill release control, the skill release control being configured to trigger the first virtual object to release a virtual skill corresponding to the skill release control.

An implementation of step 1001 may refer to step 201, which is not described again in this embodiment.

Step 1002: Determine a $k^{th}$ skill release control as the target skill release control in response to that the skill linking operation passes through the $k^{th}$ skill release control, and the $k^{th}$ skill release control is in a releasable state.

k is a positive integer less than or equal to n.

In one embodiment, the virtual skill has the skill cooling mechanism, that is, at the moment when the virtual skill is released, the terminal begins the timing according to a skill cooling duration, during the cooling of the skill, the skill release control is in the skill cooling state and cannot be triggered, and after the skill cooling duration is reached, the skill release control is in the releasable state and can be triggered.

Therefore, in a case of receiving the skill linking operation, every time the skill linking operation passes through a skill release control, the terminal needs to determine whether the skill release control is in the skill cooling state; and in a case that the skill release control is in the releasable state, that is, the virtual skill is not cooled, the terminal determines the skill release control as the target skill release control, and determines the virtual skill corresponding to the skill release control as the target virtual skill.

Step 1003: Display prompt information in response to that the skill linking operation passes through the $k^{th}$ skill release control, and the $k^{th}$ skill release control is in the skill cooling state.

The prompt information is used for prompting that the $k^{th}$ virtual skill cannot be released, the $k^{th}$ virtual kill is the virtual skill corresponding to the $k^{th}$ skill release control, and k is a positive integer less than or equal to n.

In one embodiment, in a case that the terminal determines that the $k^{th}$ skill release control is in the skill cooling state, the terminal displays the prompt information to prompt the user that the skill is cooled and cannot be triggered to release.

In another embodiment, in response to that the skill linking operation passes through the $k^{th}$ skill release control, and the $k^{th}$ skill release control is in the skill cooling state, the terminal does not display the prompt information, and continues to receive the skill linking operation. At the end of the skill linking operation, the terminal controls the first virtual object to successively release the target virtual skills, and skips the target virtual skill in the cooling state, or in a case that the target virtual skill in the cooling state is to be released, the terminal controls the first virtual object to wait, and after the skill cooling duration of the target virtual skill is reached, the terminal continues to control the first virtual object to release the target virtual skill and other target virtual skills that are not released.

Step 1004: Control the first virtual object to release an $m^{th}$ target virtual skill according to the skill release order in response to the end of the skill linking operation.

Step 1005: Switch the target skill release control corresponding to the $m^{th}$ target virtual skill from the releasable state to the skill cooling state based on the skill cooling duration of the $m^{th}$ target virtual skill.

m is a positive integer less than n.

In one embodiment, in a process that the terminal controls the first virtual object to successively and consecutively release n target virtual skills, every time a target virtual skill is released completely, the target virtual skill is cooled, and the corresponding target skill release control is switched from the releasable state to the skill cooling state.

Figure 11:
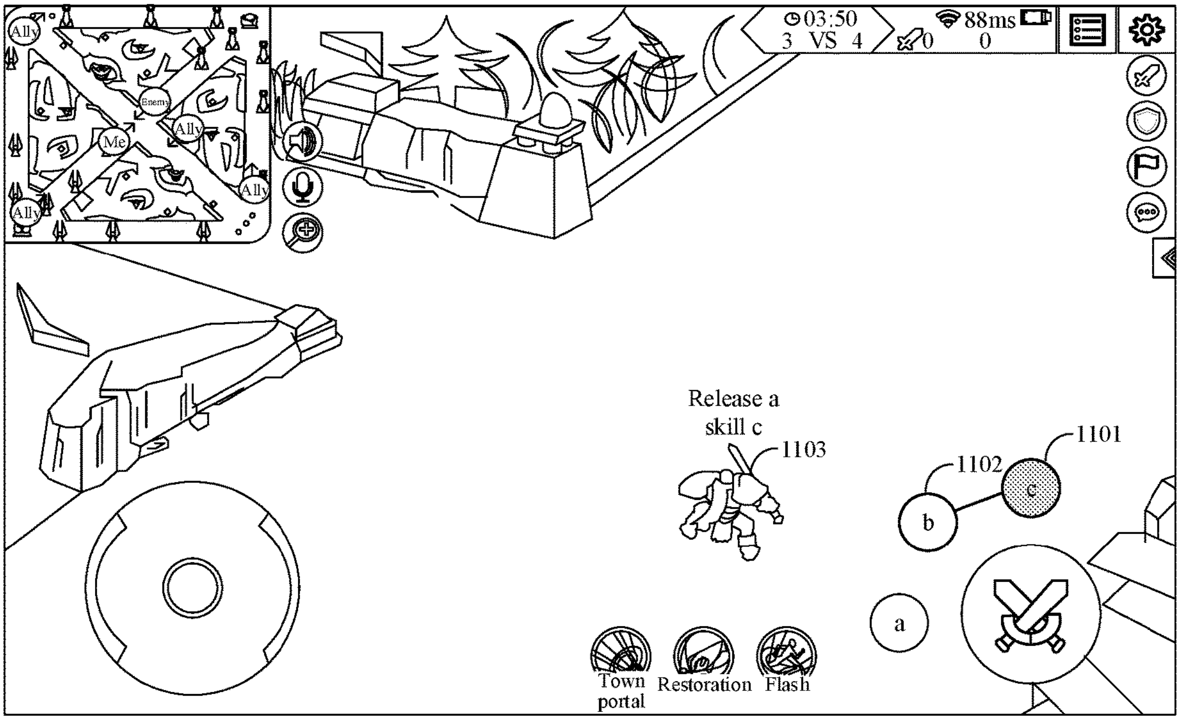
FIG. 11 is a schematic structural diagram of a skill linking operation according to another embodiment of this application.
Figure 11:
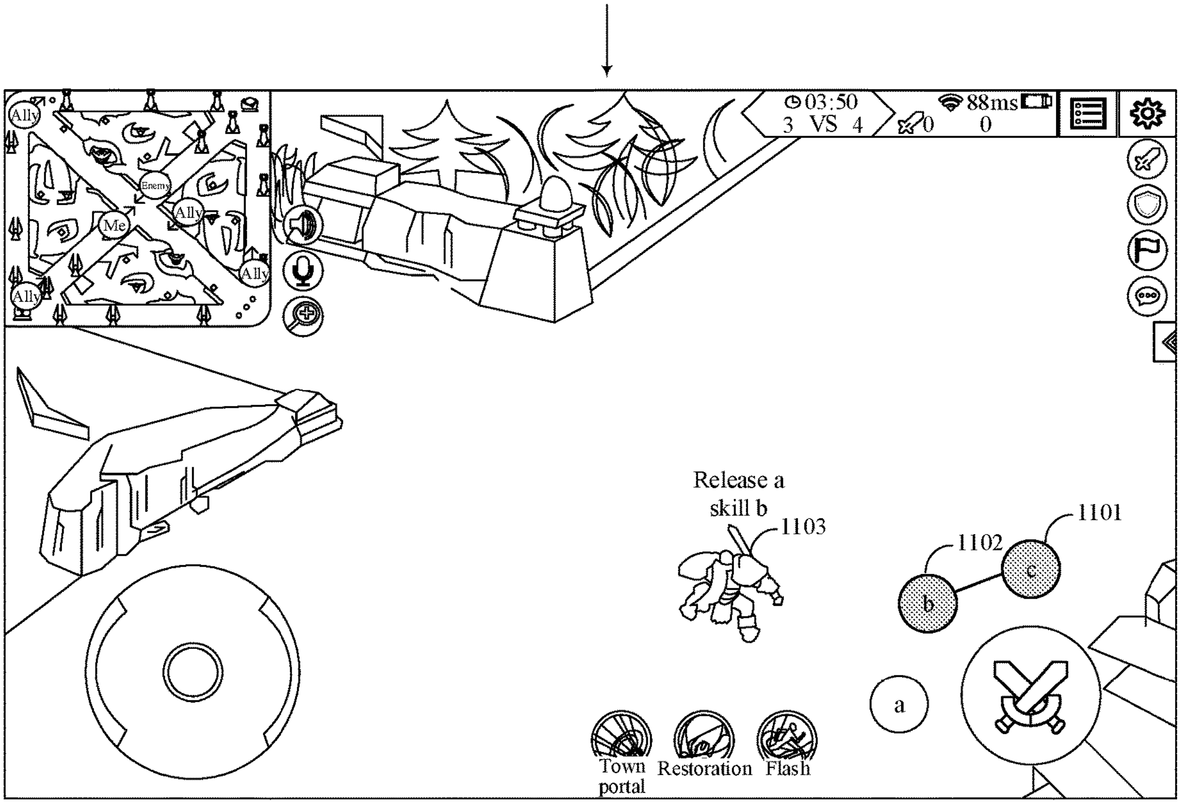

For example, as shown in FIG. 11, after controlling the first virtual object 1103 to release the target virtual skill c, the terminal switches the target skill release control 1101 corresponding to the target virtual skill c from the releasable state to the skill cooling state; and after continuing to control the first virtual object 1103 to completely release the target virtual skill b, the terminal switches the target skill release control 1102 corresponding to the target virtual skill b from the releasable state to the skill cooling state.

Step 1006: Control the first virtual object to release a $(m+1)^{th}$ target virtual skill in response to the end of the release of the $m^{th}$ target virtual skill.

After the release of the current target virtual skill is ended, the terminal controls the first virtual object to release a next target virtual skill according to the skill release order until the release of all target virtual skills is ended, thereby completing the consecutive release of multiple skills.

In some embodiments of this application, in the process of receiving the skill linking operation, the terminal determines whether each target skill trigger control is in the skill cooling state, and cools the released target virtual skill in time during the release of the skill to prevent the user from repeatedly triggering the release of skills by the single-skill release operation and the multi-skill release operation.

In the foregoing embodiment, the user can only select the virtual skill in the releasable state to automatically release the skill combo. In another embodiment, the user may select any skill possessed by the first virtual object to be released consecutively, that is, the user may select the virtual skill in the skill cooling state for skill link. After the end of the skill linking operation, and in a case that all target virtual skills are in the releasable state, the terminal controls the first virtual object to release the target virtual skills; or, after the end of the skill linking operation, the first virtual object is controlled to release the target virtual skill, and in a case that the next to-be-released target virtual skill is still in the skill cooling state, the skill release is paused, until the target virtual skill is restored to the releasable state. Step 202 also includes the following steps:

Step 202$a$: Acquire a remaining cooling duration of the $k^{th}$ virtual skill in response to that the skill linking operation passes through the $k^{th}$ skill release control, and the $k^{th}$ skill release control is in the skill cooling state.

k is a positive integer less than or equal to n.

In one embodiment, in a case that the skill linking operation passes through a skill release control, the terminal determines whether the skill release control is in the skill cooling state, acquires the remaining cooling duration in a case that the skill release control is in the skill cooling state, and performs the timing according to the remaining cooling duration.

Step 203 also includes the following steps:

Step 203$a$: Control the first virtual object to release n target virtual skills in response to the end of skill linking operation and reaching the remaining cooling duration of all target virtual skills.

In one embodiment, after the skill linking operation is ended, the terminal determines whether there is the target virtual skill in the skill cooling state at present according to the timing duration and the acquired remaining cooling duration of the target virtual skill in the skill cooling state, controls the first virtual object not to release each target virtual skill temporarily in a case that there is the target virtual skill in the skill cooling state, and then controls the first virtual object to release each target virtual skill until all target virtual skills are in the releasable state.

Or step 203 includes the following steps:

Step 203$b$: Control the first virtual object to begin to release the target virtual skill in response to the end of the skill linking operation.

In another embodiment, after the skill linking operation is ended, the terminal immediately controls the first virtual object to begin to release the target virtual skill. Firstly, whether the first target virtual skill is in the skill cooling state is determined, the release of the first target virtual skill is paused if the first target virtual skill is in the skill cooling state, and until the first target virtual skill is restored to the releasable state, the first target virtual skill is released; and the first virtual object is controlled to release the first target virtual skill if the first target virtual skill is not in the skill cooling state.

Step 203$c$: Control the first virtual object to pause the release of the skill in response to that the next target virtual skill is in the skill cooling state.

Step 203$d$: Control the first virtual object to release the target virtual skill in response to reaching the remaining cooling duration of the next target virtual skill.

In the process that the terminal controls the first virtual object to release the target virtual skill, every time a target virtual skill is released completely, the terminal determines whether the next target virtual skill is in the skill cooling state; the virtual object is controlled to continue to release the target virtual skill in a case that the next target virtual skill is not in the skill cooling state; the first virtual object is controlled to pause the release of the target virtual skill in a case that the next target virtual skill is still in the skill cooling state; and until the timing duration reaches the remaining cooling duration of the target virtual skill (that is, the next target virtual skill is restored to the releasable state), the first virtual object is controlled to release the target virtual skill.

In some embodiments of this application, the user may perform the skill link in any case without considering the state of the virtual skill. The terminal automatically controls the release of the target virtual skill, and the user does not need to wait for the end of the cooling of the virtual skill when performing the skill linking operation, so as to avoid missing the opportunity for consecutively releasing the skill, so that the consecutive release efficiency and utilization rate of the skills can be improved.

Figure 12:
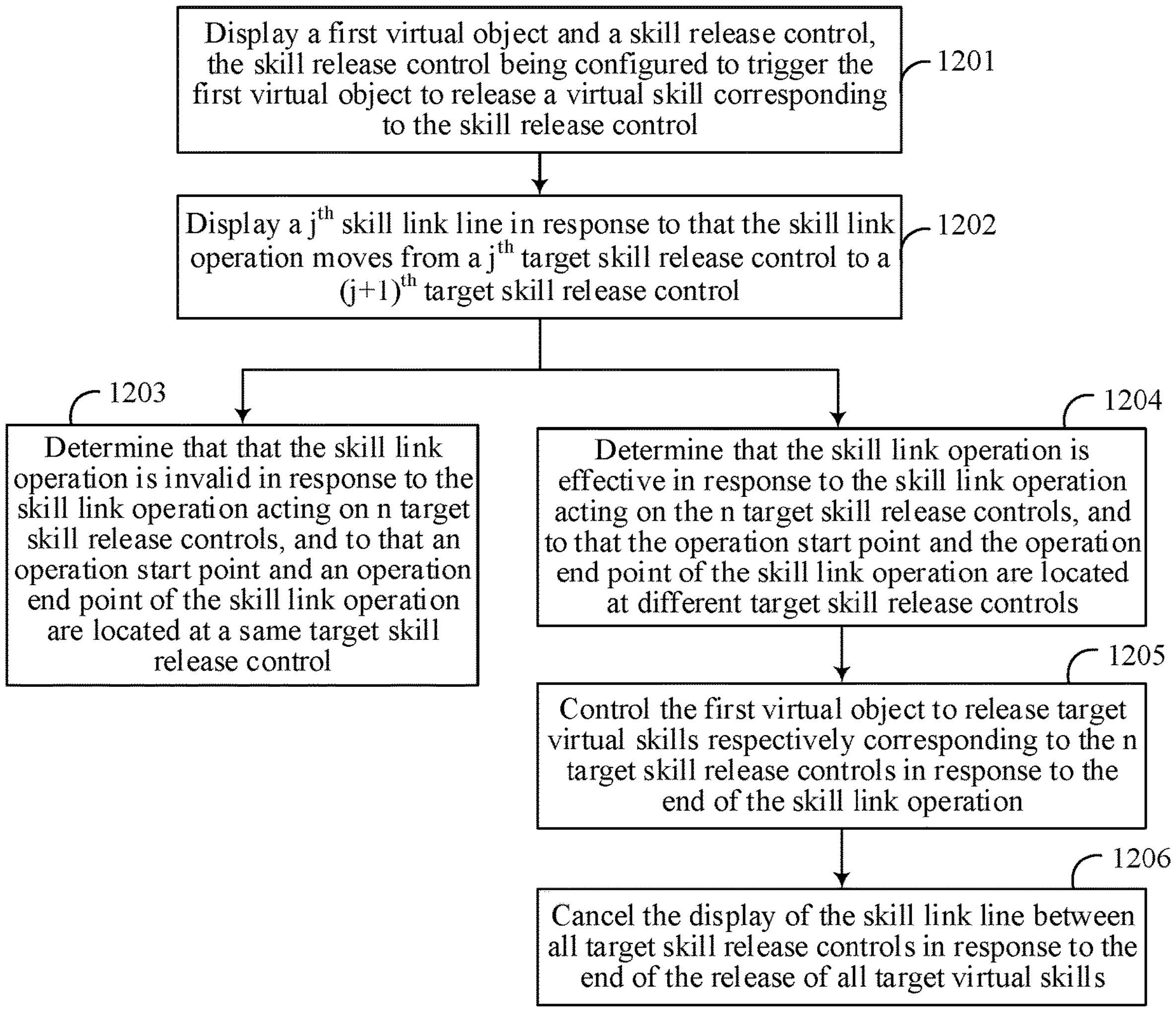
FIG. 12 is a flowchart of a method for controlling a virtual object to release skills according to another embodiment of this application.

In order to improve the operation prompt effect, and prevent the user from triggering the skill linking operation by mistake, in some embodiments of this application, the terminal indicates the target skill release control by a skill link line, and provides an operation cancel mechanism. Referring to FIG. 12, a flowchart of a method for controlling a virtual object to release skills according to another embodiment of this application is shown. This embodiment uses the method performed by a terminal supporting the display of a virtual environment as an example. The method includes the following steps:

Step 1201: Display a first virtual object and a skill release control, the skill release control being configured to trigger the first virtual object to release a virtual skill corresponding to the skill release control.

An implementation of step 1201 may refer to step 201, which is not described again in this embodiment.

Step 1202: Display a $j^{th}$ skill link line in response to that the skill linking operation moves from the $j^{th}$ target skill release control to a $(j+1)^{th}$ target skill release control.

j is a positive integer less than n; and the $j^{th}$ skill link line is used for linking the $j^{th}$ skill release control and the $(j+1)^{th}$ skill release control.

In one embodiment, because of a plurality of virtual skill controls, in order to make the user clearly know which virtual skills are linked, the terminal links the target skill release controls through which the skill linking operation passes, and displays the skill link line according to a skill link order. In a case that the skill linking operation moves from the $j^{th}$ target skill release control to the $(j+1)^{th}$ target skill release control, the $j^{th}$ skill link line is displayed. In a case that the skill linking operation moves from the $(j+1)^{th}$ skill release control to the $(j+2)^{th}$ skill release control, the terminal displays the $(j+1)^{th}$ link line between the $(j+1)^{th}$ skill release control and the $(j+2)^{th}$ skill release control, that is, the skill link line is respectively displayed between two adjacent target skill release controls.

In another embodiment, for the selected target skill release control, the terminal adopts a first link line to display the link, and for the recommendation skill release control, the second link line is adopted to prompt the link, for example, the first link line is a static link line, and the second link line is a link line with a dynamic flashing effect, or the first link line is a solid line, and the second link line is a dotted line. The recommendation skill release control corresponds to the recommendation virtual skill that is determined by the terminal according to the linked target virtual skill. There is an association between the recommendation virtual skill and at least one linked target virtual skill, for example, the recommendation virtual skill can enhance the release effect of other linked target virtual skills or the recommendation virtual skill, or can generate a beneficial effect on the first virtual object. The recommendation skill release control is linked with the linked target skill release control through the second link line, and the suitable virtual skill may be recommended to the user in a case that the user wants to trigger the consecutive release of a plurality of skills so as to improve the efficiency in triggering the consecutive release of the skills.

For example, as shown in FIG. 4, in a case of detecting that the skill linking operation moves from the target skill release control 401 to the target skill release control 402, the terminal displays the skill link line between the target skill release control 401 and the target skill release control 402.

In some embodiments, the terminal performs enhanced display for the target skill release control according to a target display effect, for example, performing the highlight display, displaying in a special color, or thickening edges, and the like so as to further enhance the prompt effect.

Step 1203: Determine that the skill linking operation is invalid in response to the skill linking operation acting on n target skill release controls, and to that an operation start point and an operation end point of the skill linking operation are located at the same target skill release control.

Step 1204: Determine that the skill linking operation is effective in response to the skill linking operation acting on n target skill release controls, and to that the operation start point and the operation end point of the skill linking operation are located at different target skill release controls.

Due to the dense display of a plurality of skill release controls in the virtual environment interface, and since the user may trigger the setting of the release target in the peripheral skill release target selection wheel in the process of triggering the skill linking operation, there is the possibility of triggering the skill linking operation by mistake, or selecting the skill release control that does not need to be triggered by mistake during the skill linking operation.

In order to avoid the above situation, an embodiment of this application also provides a skill linking operation cancel mechanism. The skill linking operation is determined to be invalid in response to the skill linking operation acting on n target skill release controls, and to that the operation start point and the operation end point of the skill linking operation are located at the same target skill release control; and the skill linking operation is determined to be effective in response to the skill linking operation acting on n target skill release controls, and to that the operation start point and the operation end point of the skill linking operation are located at different target skill release controls. In a case that the user triggers the skill linking operation by mistake, the skill linking operation may be canceled by returning the skill linking operation to the target skill release control where the operation start point is located, so that the skill linking operation is invalid.

Step 1205: Control the first virtual object to release target virtual skills respectively corresponding to the n target skill release controls in response to the end of the skill linking operation.

An implementation of step 1205 may refer to step 203, which is not described again in this embodiment.

Step 1206: Cancel the display of the skill link line between all target skill release controls in response to the end of the release of all target virtual skills.

In a case that all target virtual skills are completely released, it means that the multi-skill link release process of this round is ended, and there is no link release relationship between all target virtual skills, so that the terminal stops the display of all skill link lines.

In some embodiments of this application, in the process of receiving the skill linking operation, the terminal displays the skill link line between two adjacent target skill release controls to prompt the skill link situation. In addition, the cancel mechanism of the skill linking operation is also provided. In a case of triggering the skill linking operation by mistake, or linking the virtual skill that does not need to be released by mistake, the user may enable the skill linking operation to be invalid by enabling the operation end point to be located at the target skill release control where the operation start point is located.

In combination with the above embodiments, the method for controlling the virtual object to release the skills is described with a schematic example. The first virtual object has three virtual skills, and in the virtual environment interface, the skill release control corresponding to each virtual skill is displayed. The skill release effect of the virtual skill a is to control the first virtual object to attack forward with a virtual prop, causing 500-hit-point damage to the target virtual object; the skill release effect of the virtual skill b is to cause 50-hit-point damage to the virtual object in the skill release area, and to produce a stun effect; and the skill release effect of the virtual skill c is to cause 1000-hit-point damage to the virtual object, and cause additional 200-hit-point damage to the virtual object in a stun state. After receiving the slide operation that a slide start point is located at the skill release control b (corresponding to the virtual skill b), a slide trajectory passes through the skill release control c (corresponding to the virtual skill c), and the slide end point is located at the release target selection wheel corresponding to the skill release control c, the terminal determines the virtual skill b and the virtual skill c as the target virtual skills. Firstly, the first virtual object is controlled to release the virtual skill b to the target skill release area indicated by the slide end point, and after the virtual skill b is released completely, the terminal controls the first virtual object to release the virtual skill c.

Figure 13:
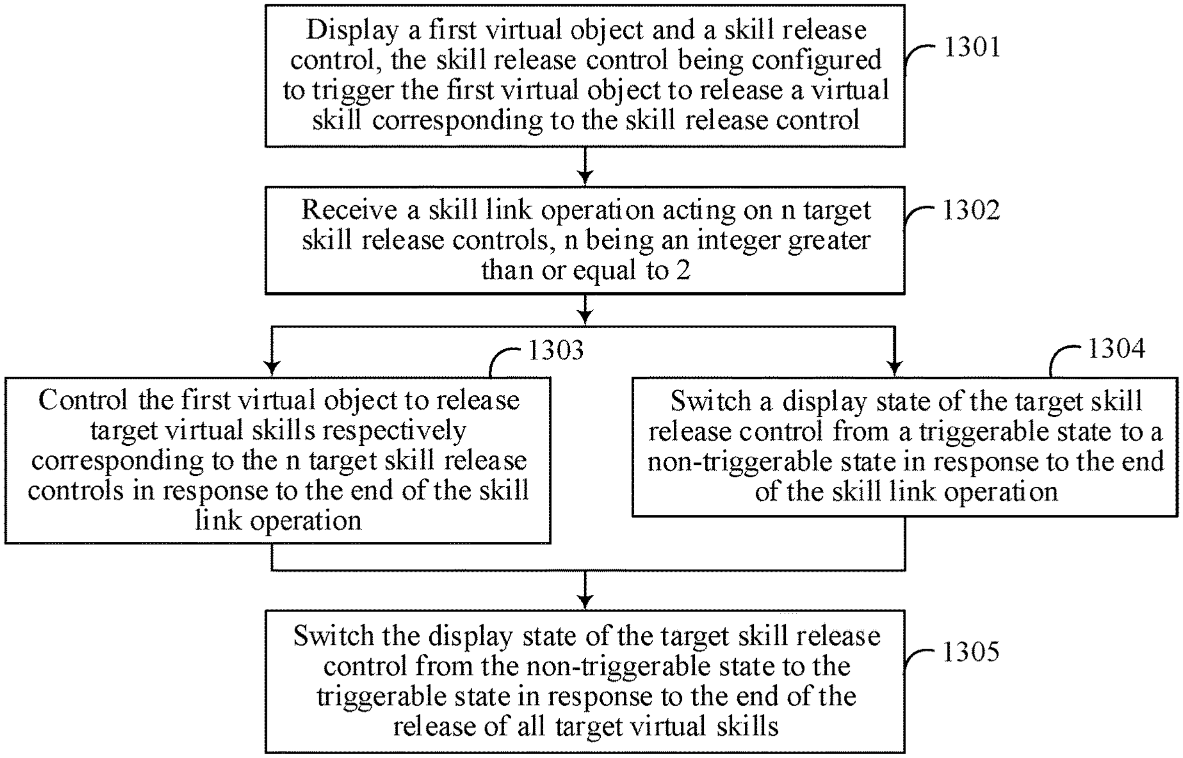
FIG. 13 is a flowchart of a method for controlling a virtual object to release skills according to another embodiment of this application.

Referring to FIG. 13, a flowchart of a method for controlling a virtual object to release skills according to another embodiment of this application is shown. This embodiment use the method performed by the terminal supporting the virtual environment as an example. The method includes the following steps.

Step 1301: Display a first virtual object and a skill release control, the skill release control being configured to trigger the first virtual object to release a virtual skill corresponding to the skill release control.

Step 1302: Receive a skill linking operation acting on n target skill release controls, n being an integer greater than or equal to 2.

Step 1303: Control the first virtual object to release target virtual skills respectively corresponding to the n target skill release controls in response to the end of the skill linking operation.

Specific implementations of steps 1301 to 1303 may refer to steps 201 to 203 described above, which are not described in detail again in this embodiment.

Step 1304: Switch a display state of the target skill release control from a triggerable state to a non-triggerable state in response to the end of the skill linking operation.

In one embodiment, after the end of the skill linking operation, in the process that the first virtual object releases the target virtual skill, the terminal switches the display state of the target skill release control from the triggerable state to the non-triggerable state, that is, in a case that the target virtual skill is not released completely, the user cannot re-trigger the target skill release control so as to avoid interfering the consecutive release of the plurality of skills.

In some embodiments, a non-triggerable identifier is displayed in the target skill release control in the non-triggerable state, or the target skill release control in the non-triggerable state is displayed in gray, or the target skill release control in the non-triggerable state is displayed in a special shape, which is not limited in some embodiments of this application.

In another embodiment, in response to the end of the skill linking operation, the terminal switches the display state of all skill release controls from the triggerable state to the non-triggerable state.

Step 1305: Switch the display state of the target skill release control from the non-triggerable state to the triggerable state in response to the end of the release of all target virtual skills.

In a case that all target skills are released completely, the terminal restores the display state of the target skill release control to the triggerable state. Further, in response to the end of the release of all target virtual skills, and reaching the skill cooling duration, the terminal switches the display state of the target skill release control from the non-triggerable state to the triggerable state.

In the embodiment of this application, after the end of the skill linking operation, and before the target virtual skills are completely released, the terminal switches the display state of the target skill release control to the non-triggerable state, so that the user is prevented from re-triggering the release of the target virtual skill during the release of multiple skills, which may interfere the consecutive release of the skills.

Figure 14:
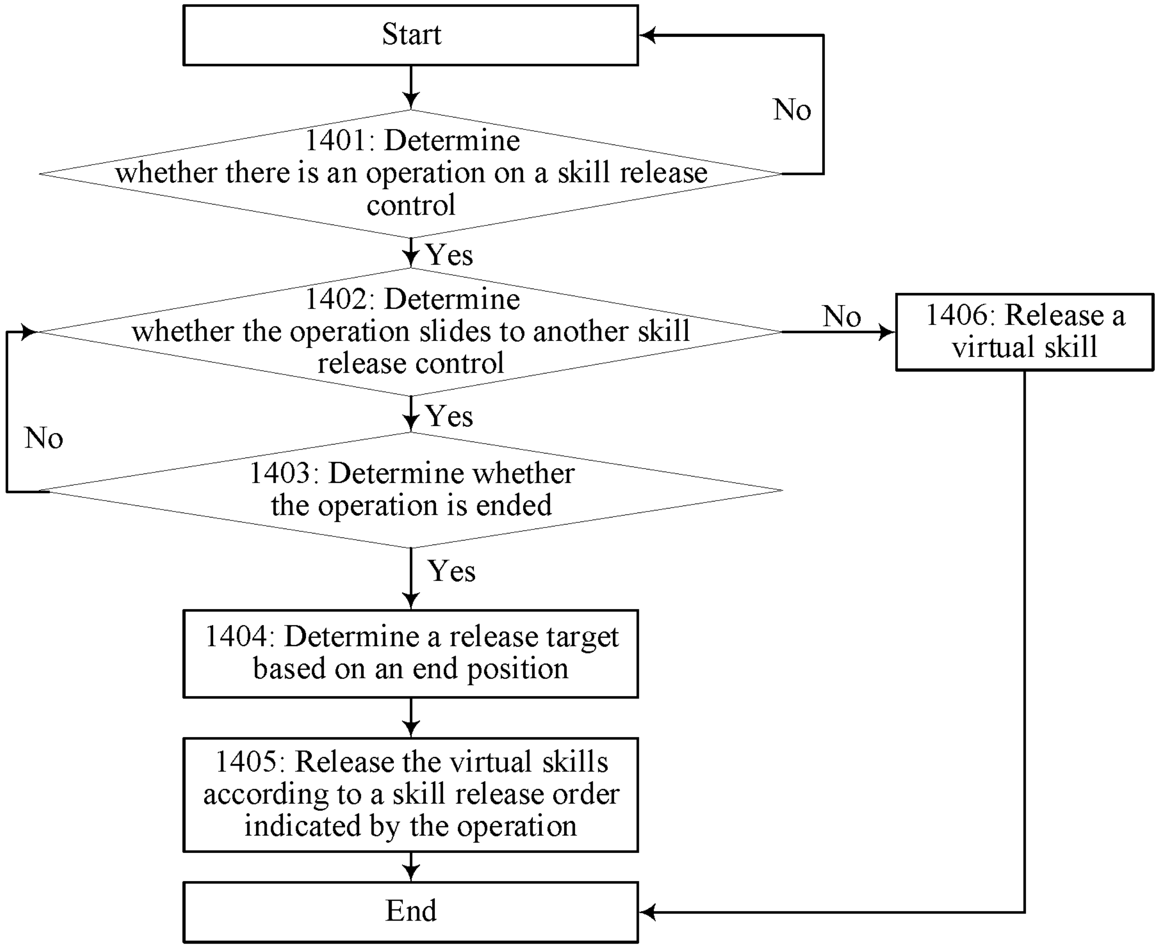
FIG. 14 is a flowchart of a method for controlling a virtual object to release skills according to another embodiment of this application.

In combination with the above embodiments, in a schematic example, the terminal performs the process of controlling the virtual object to release the skills as shown in FIG. 14. The process includes the following steps:

Step 1401: Determine whether there is an operation on the skill release control. Step 1402 is performed in a case that there is the operation on the skill release control; and the step is returned to the beginning in a case that there is no operation on the skill release control.

Step 1402: Determine whether the operation slides to another skill release control. Step 1403 is performed in a case that the operation slides to another skill release control; and step 1406 is performed in a case that the operation does not slide to another skill release control.

Step 1403: Determine whether the operation is ended. Step 1404 is performed in a case that the operation is ended; and step 1402 is performed in a case that the operation is not ended.

Step 1404: Determine a release target based on an end position.

Step 1405: Release the virtual skills according to a skill release order indicated by the operation.

Step 1406: Release the virtual skills.

Figure 15:
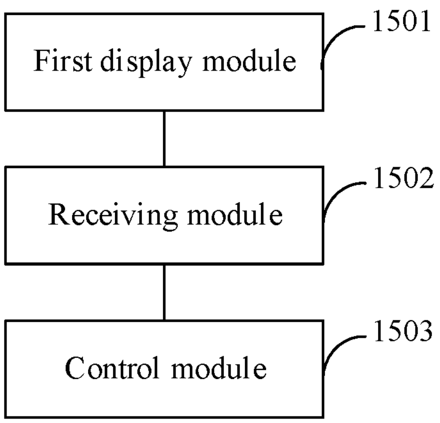
FIG. 15 is a structural block diagram of an apparatus for controlling a virtual object to release skills according to an embodiment of this application.

FIG. 15 is a structural block diagram of an apparatus for controlling a virtual object to release skills according to an embodiment of this application. The apparatus includes:

- a first display module 1501, configured to display a first virtual object and a skill release control, the skill release control being configured to trigger the first virtual object to release a virtual skill corresponding to the skill release control;
- a receiving module 1502, configured to receive a skill linking operation acting on n target skill release controls, n being an integer greater than or equal to 2; and
- a control module 1503, configured to control the first virtual object to release target virtual skills respectively corresponding to the n target skill release controls in response to the end of the skill linking operation.

In some embodiments, the control module 1503 includes:

- a first determination unit, configured to determine a control trigger order in response to the end of the skill linking operation, the control trigger order being an order in which the skill linking operation passes through n target skill release controls;
- a second determination unit, configured to determine the skill release order of the n target virtual skills based on the control trigger order, and a correspondence between the skill release control and the virtual skill; and
- a first control unit, configured to control the first virtual object to successively release the n target virtual skills according to the skill release order.

In some embodiments, the first control unit is also configured to:

control the first virtual object to successively release the n target virtual skills to the release target according to the skill release order, the release target including at least one of a release area, a release direction, and a release object.

In some embodiments, the receiving module 1502 includes:

a first display unit, configured to display a skill release target selection wheel in a wheel display area corresponding to an $i^{th}$ target skill release control in response to that the skill linking operation is located at the $i^{th}$ target skill release control, and a target virtual skill with a release target selection need exists in the i target virtual skills through which the skill linking operation passes, i being a positive integer less than n; and a second display unit, configured to cancel the display of the skill release target selection wheel in the wheel display area corresponding to the $i^{th}$ target skill release control, and display the skill release target selection wheel in the wheel display area corresponding to a $(i+1)^{th}$ target skill release control in response to that the skill linking operation is located at the $(i+1)^{th}$ target skill release control.

In some embodiments, the apparatus further includes:

a determination module, configured to determine the release target based on the position of an operation end point of the skill linking operation in the skill release target selection wheel in response to the end of the skill linking operation.

In some embodiments, the determination module includes:

a third determination unit, configured to determine the release area based on a relative position relationship and a position of the first virtual object in the virtual environment in a case that the release target is the release area, the relative position relationship being determined based on a relative position between the operation end point and the center point of the release target selection wheel;

a fourth determination unit, configured to determine the release direction based on an azimuth of the operation end point relative to the center point of the release target selection wheel in a case that the release target is the release direction; and a fifth determination unit, configured to determine the release object from the second virtual object based on an azimuth of the operation end point relative to the center point of the release target selection wheel in a case that the release target is the release object.

In some embodiments, the control module 1503 includes:

a second control unit, configured to control the first virtual object to release an $m^{th}$ target virtual skill according to the skill release order in response to the end of the skill linking operation, m being a positive integer less than n;

a third control unit, configured to switch the target skill release control corresponding to the $m^{th}$ target virtual skill from the releasable state to the skill cooling state based on the skill cooling duration of the $m^{th}$ target virtual skill; and a fourth control unit, configured to control the first virtual object to release a $(m+1)^{th}$ target virtual skill in response to the end of the release of the $m^{th}$ target virtual skill.

In some embodiments, the receiving module 1502 includes:

a sixth determination unit, configured to determine a $k^{th}$ skill release control as the target skill release control in response to that the skill linking operation passes through the $k^{th}$ skill release control, and the $k^{th}$ skill release control is in a releasable state, k being a positive integer less than or equal to n.

In some embodiments, the receiving module 1502 also includes:

an acquisition unit, configured to acquire a remaining cooling duration of the $k^{th}$ virtual skill in response to that the skill linking operation passes through the $k^{th}$ skill release control, and the $k^{th}$ skill release control is in a skill cooling state, and k being a positive integer less than or equal to n;

the control module 1503 includes:

a fifth control unit, configured to control the first virtual object to release the n target virtual skills in response to the end of skill linking operation and reaching the remaining cooling duration of all target virtual skills; or a sixth control unit, configured to control the first virtual object to begin to release the target virtual skill in response to the end of the skill linking operation; control the first virtual object to pause the skill release in response to that a next target virtual skill is in the skill cooling state; and control the first virtual object to release the next target virtual skill in response to reaching the remaining cooling duration of the next target virtual skill.

In some embodiments, the apparatus further includes:

a second display module, configured to display prompt information in response to that the skill linking operation passes through a $k^{th}$ skill release control, and the $k^{th}$ skill release control is in the skill cooling state, the prompt information being used for prompting that the $k^{th}$ virtual skill cannot be released, the $k^{th}$ virtual skill being a virtual skill corresponding to the $k^{th}$ skill release control, and k being a positive integer less than or equal to n.

In some embodiments, the receiving module 1502 includes:

a third display unit, configured to display a $j^{th}$ skill link line in response to that the skill linking operation moves from the $j^{th}$ target skill release control to a $(j+1)^{th}$ target skill release control, the $j^{th}$ skill link line being used for linking the $j^{th}$ target skill release control and the $(j+1)^{th}$ target skill release control, and j being a positive integer less than n; and the apparatus also includes:

a third display module, configured to cancel the display of the skill link line between all target skill release control in response to the end of the release of all target virtual skills.

In some embodiments, the receiving module 1502 includes:

a seventh determination unit, configured to determine that the skill linking operation is effective in response to the skill linking operation acting on n target skill release controls, and to that an operation start point and an operation end point of the skill linking operation are located at different target skill release controls.

In some embodiments, the apparatus further includes:

an eighth determination unit, configured to determine that the skill linking operation is invalid in response to the skill linking operation acting on n target skill release controls, and to that the operation start point and the operation end point of the skill linking operation are located at the same target skill release control.

In some embodiments, the apparatus further includes:

a fourth display module, configured to switch a display state of the target skill release control from a triggerable state to a non-triggerable state in response to the end of the skill linking operation; and a fifth display module, configured to switch the display state of the target skill release control from the non-triggerable state to the triggerable state in response to the end of the release of all target virtual skills.

In conclusion, in some embodiments of this application, after receiving the skill linking operation acting on the n target skill release controls, the first virtual object is controlled to automatically release the target virtual skills respectively corresponding to the n target skill release controls, so that the user may trigger a plurality of virtual skills by one operation. Compared with the way of triggering the release of a plurality of skills by repeatedly operating the skill release control for multiple times in related technologies, the user operation is simplified, and the difficulty in consecutively releasing the virtual skills is reduced.

Figure 16:
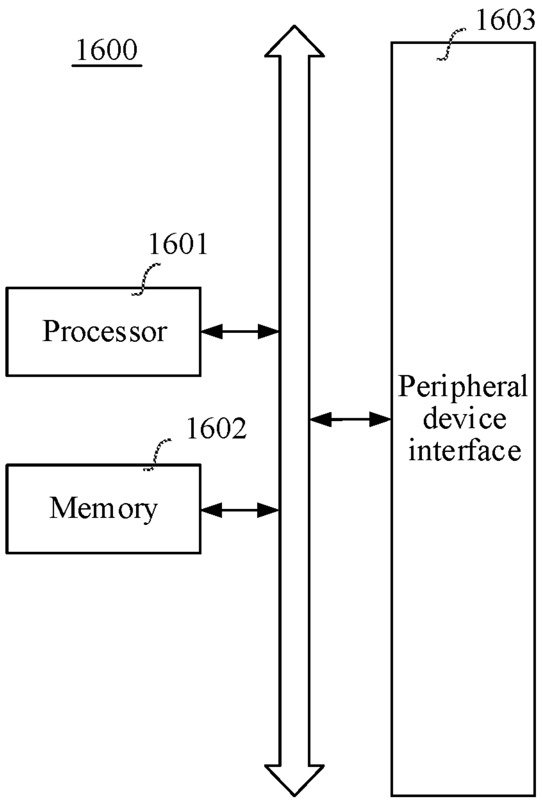
FIG. 16 is a structural block diagram of a terminal according to an embodiment of this application.

Referring to FIG. 16, a structural block diagram of a terminal 1600 according to an embodiment of this application is shown. The terminal 1600 may be a portable mobile terminal, such as: a smart phone, a tablet computer, a Moving Picture Experts Group Audio Layer III (MP3) player, and a Moving Picture Experts Group Audio Layer IV (MP4) player. The terminal 1600 may also be referred to as another name such as user equipment, a portable terminal, and the like.

The terminal 1600 generally includes: a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). Processor 1601 may also include a main processor and a coprocessor. The main processor is a processor configured to process data in an awake state, and is also referred to as a central processing unit (CPU). The co-processor is a low power consumption processor configured to process the data in a standby state. In some embodiments, the processor 1601 may be integrated with a graphics processing unit (GPU). The GPU is configured to render and draw content that needs to be displayed on a display screen. In some embodiments, processor 1601 may also include an artificial intelligence (AI) processor. The AI processor is configured to process computing operations related to machine learning.

Memory 1602 may include one or more computer-readable storage media. The computer-readable storage medium may be tangible and non-transient. Memory 1602 may further include a high-speed random access memory and a nonvolatile memory, such as one or more disk storage devices or flash storage devices. In some embodiments, the non-transitory computer-readable storage medium in the memory 1602 is configured to store at least one instruction, and the at least one instruction is configured to be executed by the processor 1601 to implement the method provided in some embodiments of this application.

In some embodiments, the terminal 1600 also In some embodiments includes: a peripheral device interface 1603.

The peripheral interface 1603 may be configured to connect at least one peripheral device related to input/output (I/O) to the processor 1601 and the memory 1602. In some embodiments, the processor 1601, the memory 1602, and the peripheral device interface 1603 are integrated on the same chip or circuit board. In some other embodiments, any one or two of the processor 1601, the memory 1602, and the peripheral device interface 1603 may be implemented on a single chip or circuit board, which is not limited in this embodiment.

An embodiment of this application further provides a computer-readable storage medium, the computer-readable storage medium storing at least one instruction, and the at least one instruction being loaded and executed by a processor to implement the method for controlling the virtual object to release the skills in the foregoing embodiments.

According to an aspect of this application, a computer program product or a computer program is provided. The computer program product or the computer program includes computer instruction, the computer instruction being stored in a computer-readable storage medium. A processor of a terminal reads the computer instruction from the computer-readable storage medium, and the processor executes the computer instruction to make the terminal execute the method for controlling the virtual object to release the skills in the foregoing optional implementations.

A person skilled in the art should be aware that in the foregoing one or more examples, functions described in some embodiments of this application may be implemented by hardware, software, firmware, or any combination thereof. When implemented by using software, the functions may be stored in a computer-readable storage medium or may be used as one or more instructions or codes in a computer-readable storage medium for transmission. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for controlling a virtual object to release skills, performed by a terminal, and comprising:

displaying a first virtual object and a skill release control, the skill release control being configured to trigger the first virtual object to release a virtual skill;

receiving a skill linking operation on n target skill release controls, n being an integer greater than or equal to 2, comprising:

displaying a skill release target selection wheel in a wheel display area corresponding to an $i^{th}$ target skill release control in response to that the skill linking operation is located at the $i^{th}$ target skill release control, and that at least one of the i target virtual skills through which the skill linking operation passes requires a release target selection, i being a positive integer less than n; and in response to that the skill linking operation moves from the $i^{th}$ target skill release control to a $(i+1)^{th}$ target skill release control, canceling the display of the skill release target selection wheel in the wheel display area corresponding to the $i^{th}$ target skill release control; and displaying the skill release target selection wheel in the wheel display area corresponding to a $(i+1)^{th}$ target skill release control, and displaying an $i^{th}$ skill link line that enters the skill release target selection wheel and connects the $i^{th}$ target skill release control with the $(i+1)^{th}$ target skill release control; and controlling the first virtual object to release target virtual skills corresponding to the n target skill release controls in response to an end of the skill linking operation.

2. The method according to claim 1, wherein the controlling the first virtual object to release target virtual skills respectively corresponding to the n target skill release controls in response to the end of the skill linking operation comprises:

determining a control trigger order in response to the end of the skill linking operation, the control trigger order being an order in which the skill linking operation passes through the n target skill release controls;

determining a skill release order of the n target virtual skills based on the control trigger order, and a correspondence between the skill release control and the virtual skill; and controlling the first virtual object to release the n target virtual skills according to the skill release order.

3. The method according to claim 2, wherein the controlling the first virtual object to release the n target virtual skills according to the skill release order comprises:

controlling the first virtual object to release the n target virtual skills to a release target according to the skill release order, the release target comprising at least one of a release area, a release direction, and a release object.

4. The method according to claim 1, wherein prior to the controlling the first virtual object to release the n target virtual skills according to the skill release order, the method further comprises:

determining a release target based on a position an end point of the skill linking operation in the skill release target selection wheel in response to the end of the skill linking operation.

5. The method according to claim 4, wherein the determining a release target based on a position of an end point of the skill linking operation in the skill release target selection wheel in response to the end of the skill linking operation comprises:

determining the release area based on a relative position relationship and a position of the first virtual object in a virtual environment in a case that the release target is the release area, the relative position relationship being based on a relative position between the operation end point and a center point of the release target selection wheel;

determining the release direction based on an azimuth of the end point relative to the center point of the release target selection wheel in a case that the release target is the release direction; and determining the release object from a second virtual object based on the azimuth of the end point relative to the center point of the release target selection wheel in a case that the release target is the release object.

6. The method according to claim 1, wherein the controlling the first virtual object to release target virtual skills respectively corresponding to the n target skill release controls in response to the end of the skill linking operation comprises:

controlling the first virtual object to release an $m^{th}$ target virtual skill in response to the end of the skill linking operation, m being a positive integer less than n;

switching the target skill release control corresponding to the $m^{th}$ target virtual skill from a releasable state to a skill cooling state based on a skill cooling duration of the $m^{th}$ target virtual skill; and controlling the first virtual object to release a $(m+1)^{th}$ target virtual skill in response to the end of the release of the $m^{th}$ target virtual skill.

7. The method according to claim 6, wherein the receiving a skill linking operation on n target skill release controls comprises:

determining a $k^{th}$ skill release control as the target skill release control in response to that the skill linking operation passes through the $k^{th}$ skill release control, and the $k^{th}$ skill release control is in the releasable state, k being a positive integer less than or equal to n.

8. The method according to claim 6, wherein the receiving a skill linking operation on n target skill release controls comprises:

acquiring a remaining cooling duration of the $k^{th}$ virtual skill in response to that the skill linking operation passes through the $k^{th}$ skill release control, and the $k^{th}$ skill release control is in the skill cooling state, k being a positive integer less than or equal to n;

the controlling the first virtual object to release target virtual skills respectively corresponding to the n target skill release controls in response to the end of the skill linking operation comprises:

controlling the first virtual object to release the n target virtual skills in response to the end of the skill linking operation and reaching the remaining cooling duration of all target virtual skills;

or controlling the first virtual object to begin to release the target virtual skill in response to the end of the skill linking operation; controlling the first virtual object to pause the release of the skill in response to that a next target virtual skill is in the skill cooling state; and controlling the first virtual object to release the next target virtual skill in response to reaching the remaining cooling duration of the next target virtual skill.

9. The method according to claim 6, further comprising:

displaying prompt information in response to that the skill linking operation passes through a $k^{th}$ skill release control, and the $k^{th}$ skill release control is in the skill cooling state, the prompt information being used for prompting that the $k^{th}$ virtual skill cannot be released, the $k^{th}$ virtual skill being a virtual skill corresponding to the $k^{th}$ skill release control, and k being a positive integer less than or equal to n.

10. The method according to claim 1, further comprising:

canceling the display of the skill link line between all target skill release controls in response to the end of the release of all target virtual skills.

11. The method according to claim 1, wherein the receiving a skill linking operation on n target skill release controls comprises:

determining that the skill linking operation is effective in response to the skill linking operation on the n target skill release controls, and to that an operation start point and an operation end point of the skill linking operation are located at different target skill release controls.

12. The method according to claim 1, further comprising: determining that the skill linking operation is invalid in response to the skill linking operation on n target skill release controls, and that the operation start point and the operation end point of the skill linking operation are located at the same target skill release control.

13. The method according to claim 1, wherein after receiving the skill linking operation on the n target skill release controls, the method further comprises:

switching a display state of the target skill release control from a triggerable state to a non-triggerable state in response to the end of the skill linking operation; and further comprising:

switching the display state of the target skill release control from the non-triggerable state to the triggerable state in response to the end of the release of all target virtual skills.

14. The method according to claim 1, further comprising: in response to that the skill linking operation is located at the $(i+1)^{th}$ target skill release control, determining a recommendation skill release control based on at least one of the (i+1) target virtual skills through which the skill linking operation passes, and displaying a recommendation skill link line that connects the $(i+1)^{th}$ target skill release control with the candidate skill release control.

15. The method according to claim 14, wherein the recommendation skill link line and the $i^{th}$ skill link line have different display effects.

16. A terminal, comprising a processor and a memory; and the memory storing at least one instruction, at least one program, a code set, or an instruction set, and the at least one instruction, the at least one program, the code set, or the instruction set being loaded and executed by the processor to implement a method for controlling a virtual object to release skills, performed by a terminal, and comprising:

displaying a first virtual object and a skill release control, the skill release control being configured to trigger the first virtual object to release a virtual skill;

receiving a skill linking operation on n target skill release controls, n being an integer greater than or equal to 2, comprising:

displaying a skill release target selection wheel in a wheel display area corresponding to an $i^{th}$ target skill release control in response to that the skill linking operation is located at the $i^{th}$ target skill release control, and that at least one of the i target virtual skills through which the skill linking operation passes requires a release target selection, i being a positive integer less than n; and in response to that the skill linking operation moves from the $i^{th}$ target skill release control to a $(i+1)^{th}$ target skill release control, canceling the display of the skill release target selection wheel in the wheel display area corresponding to the $i^{th}$ target skill release control; and displaying the skill release target selection wheel in the wheel display area corresponding to a $(i+1)^{th}$ target skill release control, and displaying an $i^{th}$ skill link line that enters the skill release target selection wheel and connects the $i^{th}$ target skill release control with the $(i+1)^{th}$ target skill release control; and controlling the first virtual object to release target virtual skills corresponding to the n target skill release controls in response to an end of the skill linking operation.

17. The terminal according to claim 16, wherein the controlling the first virtual object to release target virtual skills respectively corresponding to the n target skill release controls in response to the end of the skill linking operation comprises:

determining a control trigger order in response to the end of the skill linking operation, the control trigger order being an order in which the skill linking operation passes through the n target skill release controls;

determining a skill release order of the n target virtual skills based on the control trigger order, and a correspondence between the skill release control and the virtual skill; and controlling the first virtual object to release the n target virtual skills according to the skill release order.

18. The terminal according to claim 17, wherein the controlling the first virtual object to release the n target virtual skills according to the skill release order comprises:

controlling the first virtual object to release the n target virtual skills to a release target according to the skill release order, the release target comprising at least one of a release area, a release direction, and a release object.

19. The terminal according to claim 16, wherein prior to the controlling the first virtual object to release the n target virtual skills according to the skill release order, the method further comprises:

determining a release target based on a position an end point of the skill linking operation in the skill release target selection wheel in response to the end of the skill linking operation.

20. A non-transitory computer-readable storage medium, storing at least one computer program, and the computer program being loaded and executed by one or more processors to implement a method for controlling a virtual object to release skills, performed by a terminal, and comprising:

displaying a first virtual object and a skill release control, the skill release control being configured to trigger the first virtual object to release a virtual skill;

receiving a skill linking operation on n target skill release controls, n being an integer greater than or equal to 2, comprising:

displaying a skill release target selection wheel in a wheel display area corresponding to an $i^{th}$ target skill release control in response to that the skill linking operation is located at the $i^{th}$ target skill release control, and that at least one of the i target virtual skills through which the skill linking operation passes requires a release target selection, i being a positive integer less than n; and in response to that the skill linking operation moves from the $i^{th}$ target skill release control to a $(i+1)^{th}$ target skill release control, canceling the display of the skill release target selection wheel in the wheel display area corresponding to the $i^{th}$ target skill release control; and displaying the skill release target selection wheel in the wheel display area corresponding to a $(i+1)^{th}$ target skill release control, and displaying an $i^{th}$ skill link line that enters the skill release target selection wheel and connects the $i^{th}$ target skill release control with the $(i+1)^{th}$ target skill release control; and controlling the first virtual object to release target virtual skills corresponding to the n target skill release controls in response to an end of the skill linking operation.

* * * * *